US012798964B2

(12) United States Patent
Harale et al.

(10) Patent No.: US 12,798,964 B2
(45) Date of Patent: Nov. 17, 2026

(54) MEMBRANE ASSISTED REFORMING PROCESS FOR THE PRODUCTION OF LOW CARBON HYDROGEN

(71) Applicant: Saudi Arabian Oil Company, Dhahran (SA)

(72) Inventors: Aadesh Harale, Dhahran (SA); Aqil Jamal, Dhahran (SA); Stephen N. Paglieri, Dhahran (SA); Osamah Siddiqui, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 495 days.

(21) Appl. No.: 18/484,148

(22) Filed: Oct. 10, 2023

(65) Prior Publication Data

US 2025/0115480 A1 Apr. 10, 2025

(51) Int. Cl.
*C01B 3/48* (2006.01)
*B01D 53/22* (2006.01)
(Continued)

(52) U.S. Cl.
CPC .............. *C01B 3/48* (2013.01); *B01D 53/228* (2013.01); *B01J 23/755* (2013.01); *C01B 3/505* (2013.01); *C10L 3/103* (2013.01); *B01D 2257/504* (2013.01); *C01B 2203/0205* (2013.01); *C01B 2203/0283* (2013.01);
(Continued)

(58) Field of Classification Search
None
See application file for complete search history.

(56) References Cited

U.S. PATENT DOCUMENTS 5,741,474 A 4/1998 Isomura et al.
7,947,116 B2 5/2011 Mundschau et al.
(Continued)

FOREIGN PATENT DOCUMENTS

CA 3069387 1/2019
CN 102844267 12/2012
(Continued)

OTHER PUBLICATIONS

Bang et al., "High-purity hydrogen production via a water-gas-shift reaction in a palladium-copper catalytic membrane reactor integrated with pressure swing adsorption," Chemical Engineering Journal, May 2021, 411(1):128473, 8 pages.
(Continued)

*Primary Examiner* — Keling Zhang
(74) *Attorney, Agent, or Firm* — DINSMORE & SHOHL LLP

(57) ABSTRACT

A system and a method for producing hydrogen are provided. An exemplary method for producing hydrogen. The method includes desulfurizing a natural gas stream to form a sweet gas stream, converting higher hydrocarbons in the sweet gas stream to methane to form a methane stream, converting a portion of the methane in the methane stream to a syngas stream in a membrane reformer, and separating a portion of hydrogen from the syngas stream as a permeate stream from the membrane reformer. The retentate stream from the membrane reformer is fed to an autothermal reformer to form an oxidized stream. The membrane reformer is heated with the oxidizer stream.

8 Claims, 10 Drawing Sheets

(51) Int. Cl.

| | |
|---|---|
| ***B01J 23/755*** | (2006.01) |
| ***C01B 3/505*** | (2026.01) |
| ***C10L 3/10*** | (2006.01) |

(52) U.S. Cl.

CPC ................. *C01B 2203/0405* (2013.01); *C01B 2203/0475* (2013.01); *C01B 2203/065* (2013.01); *C01B 2203/0805* (2013.01); *C01B 2203/1241* (2013.01)

(56) References Cited

U.S. PATENT DOCUMENTS

| | | | | |
|---|---|---|---|---|
| 9,611,144 | B2 | 4/2017 | Chakravarti et al. | |
| 2008/0213142 | A1 | 9/2008 | Katsurayama et al. | |
| 2017/0088419 | A1 | 3/2017 | Wynn et al. | |
| 2021/0395083 | A1* | 12/2021 | Harale | B01J 19/2475 |
| 2023/0119784 | A1 | 4/2023 | Reinertsen et al. | |
| 2023/0174378 | A1 | 6/2023 | Cotton et al. | |

FOREIGN PATENT DOCUMENTS

| | | | |
|---|---|---|---|
| CN | 110944938 | | 3/2020 |
| CN | 113474283 | | 10/2021 |
| JP | 2007524553 | | 8/2007 |
| JP | 2011526873 | | 10/2011 |
| WO | WO 2019020515 | | 1/2019 |
| WO | WO 2021257381 | A1 | 12/2021 |
| WO | WO 2022003312 | A1 | 1/2022 |

OTHER PUBLICATIONS

Patrascu, "Scaled Down Hydrogen Production in Palladium-Based Membrane Reactors: Process Design and Experimental Investigations," PhD Extended Abstract, Technion—Israel Institute of Technology, 2017, 10 pages.

Skrebergene, "New technologies for Carbon Capture in hydrogen production from Fossil Fuels," Thesis for the degree of Master of Energy and Environmental Engineering, Norwegian University of Science and Technology, Jun. 2015, 181 pages.

U.S. Appl. No. 18/484,119, Harale et al.

International Search Report and Written Opinion in International Appln. No. PCT/US2024/050460, mailed on Dec. 23, 2024, 13 pages.

PCT International Search Report and Written Opinion in International Appln. No. PCT/US2024/049890, mailed on Dec. 23, 2024, 14 pages.

* cited by examiner

MEMBRANE ASSISTED REFORMING PROCESS FOR THE PRODUCTION OF LOW CARBON HYDROGEN

TECHNICAL FIELD

This disclosure relates to methods of producing hydrogen from natural gas using a reforming process that recycles heat to decrease the amount of carbon released.

BACKGROUND

Hydrogen is used in many commercial processes, including fertilizer production and oil refining. Currently, most hydrogen used is produced from fossil fuels, which emit large amounts of carbon into the atmosphere. While green hydrogen can be produced directly from the electrolysis of water, the low efficiency of the process and the limits on renewable energy, limit the amount produced through this technique.

Reforming processes can be used to generate hydrogen for the hydrogen economy. However, the processes are generally provided with the heat used for the endothermic reforming reaction by burning natural gas or other hydrocarbons to generate the heat. This results in significant amounts of carbon emissions.

SUMMARY

An embodiment described herein provides a method for producing hydrogen. The method includes desulfurizing a natural gas stream to form a sweet gas stream, converting higher hydrocarbons in the sweet gas stream to methane to form a methane stream, converting a portion of the methane in the methane stream to a syngas stream in a membrane reformer, and separate a portion of hydrogen from the syngas stream as a permeate stream from the membrane reformer. The retentate stream from the membrane reformer is fed to an autothermal reformer to form an oxidized stream. The membrane reformer is heated with the oxidizer stream.

Another embodiment described herein provides a system for producing hydrogen from natural gas while recovering heat energy. The system includes a desulfurizer reactor coupled to a natural gas feed, a pre-reformer coupled to an effluent from the desulfurizer, and a membrane reformer coupled to an effluent from the prereformer, wherein a permeate outlet from the membrane reformer removes a hydrogen stream from the membrane reformer. An autothermal reactor (ATR) is coupled to a retentate outlet from the membrane reformer.

DETAILED DESCRIPTION

Various embodiments described herein provide integrated autothermal and heat-exchanger reformer systems, and a method of using the systems to make low carbon hydrogen. The systems utilize a membrane-based hydrogen separation in conjunction with both steam methane reforming reactions in a heat-exchanger reformer and autothermal reforming reactions. The waste heat from the exit stream of the autothermal reformer provides the heat input required by the endothermic reaction in the heat-exchanger reformer. Thus, these systems utilize the waste heat generated in an autothermal reactor, lowering the carbon footprint of the processes.

Further, the systems integrate hydrogen selective membranes that include palladium and other metals into the thermo-neutral reforming process. In various embodiments, the hydrogen selective membranes are used for separating $H_2$ and $CO_2$, in a membrane water-gas shift reactor, or as a membrane reformer, or combinations thereof. The use of the hydrogen selective membrane increases the efficiency of the process for low carbon hydrogen production.

Figure 1:
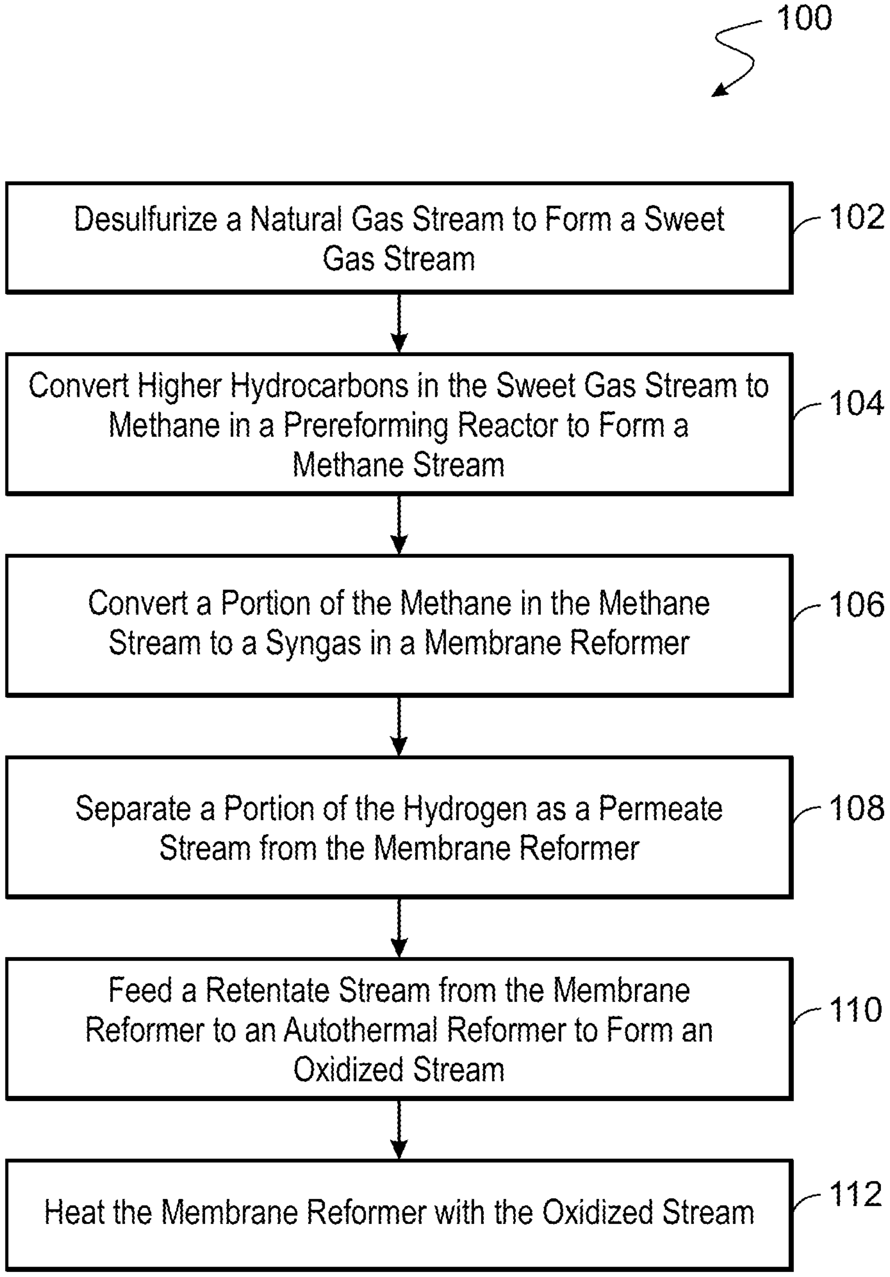
FIG. 1 is a process flow diagram of a method for producing low carbon hydrogen from natural gas.

FIG. 1 is a process flow diagram of a method 100 for producing low carbon hydrogen from natural gas. The hydrocarbon feed may be compressed to a pressure between about 8 bar and about 50 bar, or between about 20 and about 40 bar. The feed hydrocarbon may be naphtha, kerosene, diesel, or other refined petroleum products. The feed hydrocarbon may include, for example, natural gas, methane, liquefied petroleum gas (LPG), or a mixture of $C_1$-$C_6$, or any combinations thereof. The LPG may include, for example, propane and butane. The feed hydrocarbon may include organic sulfur compounds, such as thiols, thiophenes, organic sulfides disulfides, and the like.

The method begins at block 102, when a natural gas stream is desulfurized to form a sweet gas stream. The compressed hydrocarbon feed may be fed to a sulfur-removal unit (hydrodesulfurization unit) to remove sulfur compounds. Sulfur compounds can be poisonous to the catalysts used in the pre-reformer or the reformer. Hydrogen is fed to the sulfur removal unit to hydrogenate the sulfur compounds to remove the sulfur from the hydrocarbon feed. Typically, the sulfur removal unit operates, for example, at temperatures between about 250° C. and about 450° C. and pressures between about 1 bar and about 50 bar or between about 20 bar and about 40 bar. The sulfur-free hydrocarbon feed, for example, less than 1 ppm sulfur, leaves the sulfur removal unit.

The hydrodesulfurization unit may include a catalytic reactor, such as a fixed-bed reactor that is a reactor vessel having a fixed bed of catalyst. In operation, the fixed-bed reactor may convert sulfur compounds in the hydrocarbon feed to $H_2S$ for ease of removal. In implementations, the fixed-bed reactor may be characterized as a hydrotreater that performs hydrogenation. In operation for some implementations, the hydrocarbon feed may be pre-heated, for example, in a heat exchanger, and fed to the fixed-bed reactor. Hydrogen is also fed to the fixed-bed reactor for the hydrodesulfurization as a hydrogenation reaction. The source of the hydrogen can be the membrane water gas shift reactor. The catalyst in the fixed bed may be hydrodesulfurization catalyst. For example, the hydrodesulfurization catalyst may be molybdenum disulfide (MoS) or tungsten. The catalyst may be based on MoS supported on γ-alumina. The catalyst may be a cobalt-modified MoS. The hydrodesulfurization catalyst may have an alumina base impregnated with cobalt and molybdenum, generally termed a CoMo catalyst.

The hydrodesulfurization reaction occurs in presence of the catalyst in the fixed-bed reactor at a temperature for example, in the range of about 300° C. to about 400° C. and a pressure, for example, in the range of about 30 bar to about 130 bar. As mentioned, the hydrodesulfurization reaction in the fixed-bed reactor may be a hydrogenation reaction, i.e., giving addition of hydrogen (H). In particular, the type of hydrogenation reaction is hydrogenolysis that cleaves the C—S bond and forms C—H and H—S bonds. The hydrodesulfurization (hydrogenation) reaction with the example of propanethiol ($C_3H_7SH$) as a sulfur impurity in the hydrocarbon feed is as follows: $C_3H_7SH+H_2 \rightarrow C_3H_8+H_2S$.

The fixed-bed reactor may additionally include a bed (e.g., packed bed) of absorbent (e.g., zinc oxide or ZnO) to remove (absorb) the $H_2S$ from the hydrocarbon (e.g., naphtha). The $H_2S$ removed from the hydrocarbon via capture of the $H_2S$ into the absorbent may include the $H_2S$ formed in the hydrodesulfurization conversion of sulfur compounds and also the $H_2S$ that entered the fixed-bed reactor in the hydrocarbon feed. The fixed bed reactor may discharge the hydrocarbon, for example, having less than less than 1 ppm sulfur. In some implementations, the absorbent is not in the fixed-bed reactor but instead in a second vessel that receives the hydrocarbon having the $H_2S$ from the fixed-bed reactor. Thus, in those implementations, the second vessel discharges the hydrocarbon 214 having, for example, less than 1 ppm sulfur. In either configuration, the ZnO bed that captures the $H_2S$ may be replaced with a fresh ZnO bed including over the maintenance cycle.

At block 104, higher hydrocarbons in the sweet gas stream are converted to methane in a pre-reforming reactor to form a methane stream. For example, the higher hydrocarbons can include ethane, propane, butane, pentane, hexane, naphtha, liquid petroleum gas (LPG), natural gas (NG), and higher hydrocarbons. Further, the higher hydrocarbons can include any isomers of these compounds, including branched compounds and compounds with double or triple bonds, such as ethylene, acetylene, propylene, butane, and the like. The conversion is performed by steam reforming the sweet gas stream under relatively mild conditions, for example, the inlet stream of the pre-reformer is maintained at 450° C. and 34 bar.

The pre-reformer is typically fed with steam to crack, in the presence of pre-reforming catalyst, the long hydrocarbon molecules into methane. Different catalysts are developed to pre-reform different types of hydrocarbon feeds. The pre-reformer may operate between about 300° C. and about 650° C., or between about 400° C. and about 600° C., and between about 8 bar and about 50 bar, or between about 10 bar and about 40 bar.

The pre-reformer may be a vessel having a pre-reforming catalyst to convert higher molecular-weight hydrocarbons to methane. A feed conduit may flow the feed hydrocarbons to the pre-reformer. A steam conduit may flow steam to the pre-reformer. In implementations, the steam conduit may introduce the steam into the hydrocarbons flowing in the feed conduit to the pre-reformer.

The hydrocarbons fed to the pre-reformer may be liquid hydrocarbons, e.g., with a final boiling point of at least about 630 K. The hydrocarbons may be condensates from natural gas stream ($C_5$-$C_6$ hydrocarbons), liquefied petroleum gas (LPG), naphtha, kerosene, diesel, or other refined petroleum products. The catalyst in the pre-reformer may be a bed (e.g., packed bed) of pre-reforming catalyst. The catalyst in the pre-reformer may be a nickel-based catalyst, noble-metal based catalyst, transition-metal based catalyst, and the like. In operation, the hydrocarbons and steam react in presence of the pre-reforming catalyst to generate methane. The reaction in the pre-reformer may generate reformate including primarily methane. As discussed, the operating temperature in the pre-reformer may be, for example, in the range of about 500° C. to about 600° C. In embodiments, electrical heaters (e.g., resistive heaters) may be dispose in or on the pre-reformer vessel to provide heat for the reaction. On the other hand, the pre-reformer vessel may be insulated (thermal insulation) without electrical heaters. The pre-reforming reaction may operate in adiabatic mode under targeted operating conditions generally not utilized additional heat other than heating the feed to input temperatures and providing sufficient thermal insulation to avoid heat loses. The operating pressure in the pre-reformer may be, for example, in the range of about 10 bar to about 50 bar At block 106 a portion of the methane in the methane stream is converted to a syngas, e.g., hydrogen and carbon monoxide, in a membrane reformer. This forms a mixed syngas/methane stream.

At block 108, a portion of the hydrogen is separated from the syngas through a hydrogen separation membrane in the membrane reformer and exits as a permeate stream. The heat for the membrane reformer is provided by an autothermal reformer.

At block 110, a retentate stream from the membrane reformer is fed to an autothermal reformer. The retentate stream is reacted with an oxygen stream to form an oxidized stream. At block 112, the oxidized stream is passed through a heat exchanger in the membrane reformer to heat the membrane reformer to operating temperatures.

Further, in addition to providing the heat from the ATR, the oxidized stream from ATR undergoes a water-gas shift conversion in which CO and $H_2O$ are converted to $CO_2$ and $H_2$. In this second pass, a substantially complete conversion of CO or carbon to $CO_2$ is achieved, while produced hydrogen is separated. This results in product streams of nearly pure $H_2$, and a $CO_2$ product stream that includes small amounts of unconverted CO, $CH_4$ or unrecovered $H_2$.

Not all of the steps listed are required in every embodiment. Further, additional steps may be included, for example, for hydrogen purification.

Figure 2:
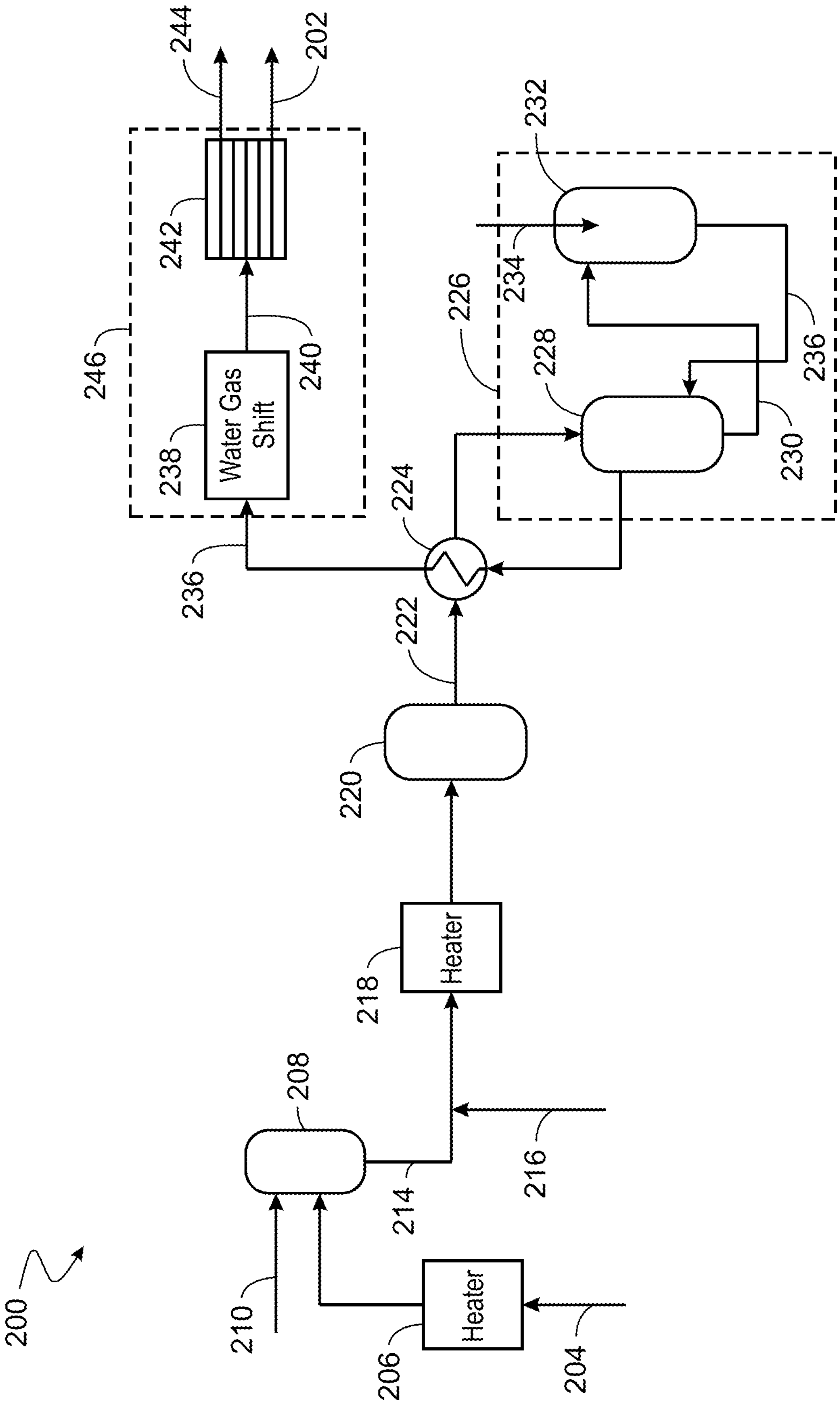
FIG. 2 is a simplified process flow diagram of an integrated system to produce hydrogen from natural gas using energy recycled in the process.

FIG. 2 is a simplified process flow diagram of an integrated system 200 to produce hydrogen 202 from natural gas 204 using energy recycled in the process. The natural gas 204 enters the system and is passed through a heater 206 to raise the temperature. After heating, the natural gas 204 is passed to a desulfurization reactor 208 where it is reacted with hydrogen 210 to convert any sulfur-containing compounds to hydrogen sulfide and is captured by ZnO, forming a sweet gas stream 214.

After desulfurization, steam 216 is injected into the sweet gas stream 214, and the mixed stream is passed through a heater 218, before being sent to a pre-reformer 220. As discussed herein, the pre-reformer 220 converts higher hydrocarbons, such as propane, butane, pentane, hexane, contained in the sweet gas stream 214 to methane.

The methane stream 222 from the pre-reformer 220 is passed through a heat exchanger 224 where it is heated by a syngas stream from the reforming process 226. The heated stream is passed to a heat-exchanger reformer (HER) 228 where the steam methane reforming reaction occurs. The methane/syngas stream 230 exiting the HER 228 is sent to an autothermal reformer (ATR) 232. An oxidizer stream 234, such as oxygen, is also fed to the ATR 232. The ATR 232 performs two reactions, a further steam methane reforming reaction and an exothermic partial oxidation reaction. In the ATR 232, the unreacted methane in the methane/syngas stream 230 from the HER 228 participates in these reactions to produce hydrogen and generate thermal energy in the partial oxidation reaction.

The syngas stream 236 exiting the ATR 232 is sent through a heat exchanger in the HER 228 to provide the heat for the endothermic steam-methane reforming reaction. In addition, after leaving the HER 228, the hot gaseous mixture is also passed through the heat exchanger 224 to pre-heat the methane stream 222 for the HER 228.

The syngas stream 236 is sent to the water gas shift (WGS) reactor 238 where the carbon monoxide in the syngas stream 236 reacts with water to be converted to hydrogen and carbon dioxide, forming a raw hydrogen stream 240. The raw hydrogen stream 240 is fed to a membrane separator 242 that separates the hydrogen 202 from carbon dioxide 244 and other gases.

The WGS reactor 238 and the membrane separator 242 form a hydrogen formation and separation system 246. In some embodiments, the hydrogen formation and separation system 246 are incorporated into a single reactor, as discussed further with respect to FIG. 4. The system of FIG. 2 was modeled using Aspen Plus V12.1.

Figure 3:
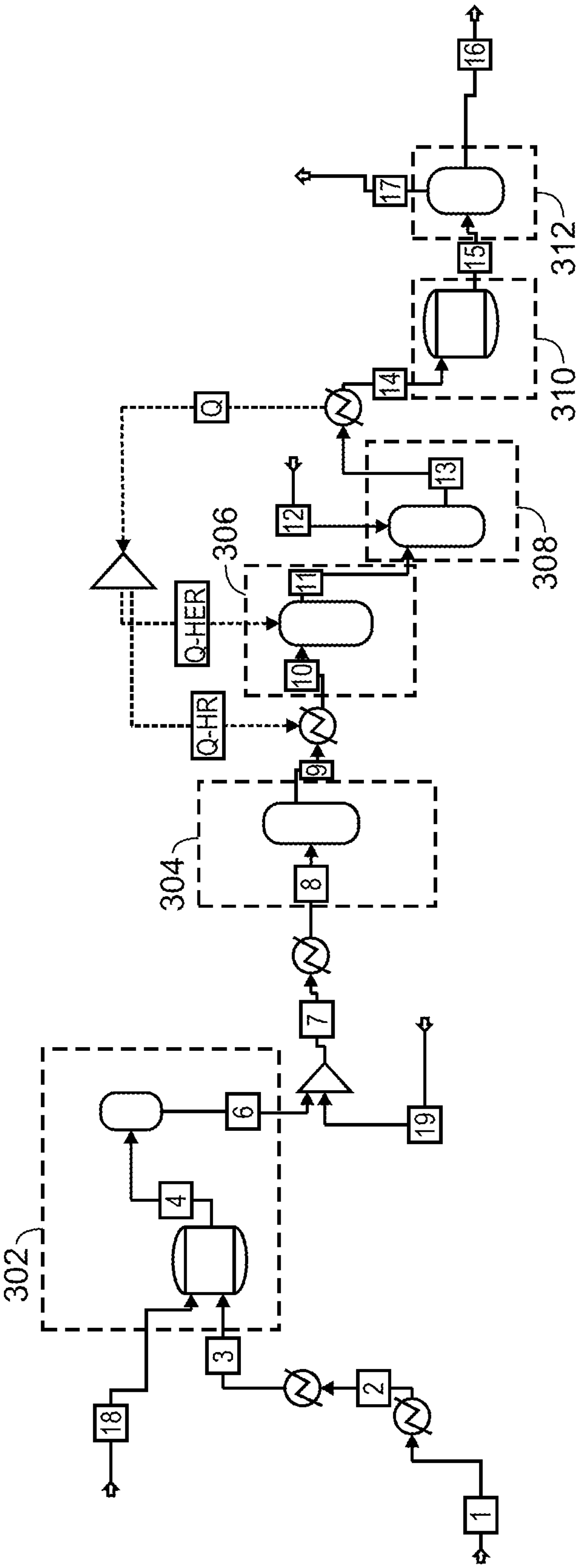
FIG. 3 is a drawing of the Aspen plus flowsheet of the system configuration of FIG. 2.

FIG. 3 is a drawing of the Aspen plus flowsheet of the system configuration of FIG. 2. The molar fractions, mass flow rates, temperatures, and pressures of different components in each process stream are provided in Table 1. The boxed labels shown in FIG. 3 correspond to the labeled columns in Tables 1A-1C. The heat duties of different system components are listed in Table 2. Stream 1 comprises the natural gas feed with a typical composition as provided in Table 1. In FIG. 3, the gas flow is through the desulfurization section 302 and then to the pre-reformer section 304. From the pre-reformer section 304, the gas flows into the heat exchanger reformer 306 and then into the autothermal reformer 308. The gas flow is then to the water gas shift section 310 can into the membrane separator section 312.

TABLE 2

Heat duties of major system components of configuration 1

| Component | Heat duty (kW) |
|---|---|
| H1 | 11984 |
| H2 | 69.8 |
| H3 | 34636 |
| H4 (Q-HR) | 62744 |
| HER (Q-HER) | 79856 |
| H5 | −142601 |
| WGS | −12098 |

Figure 4:
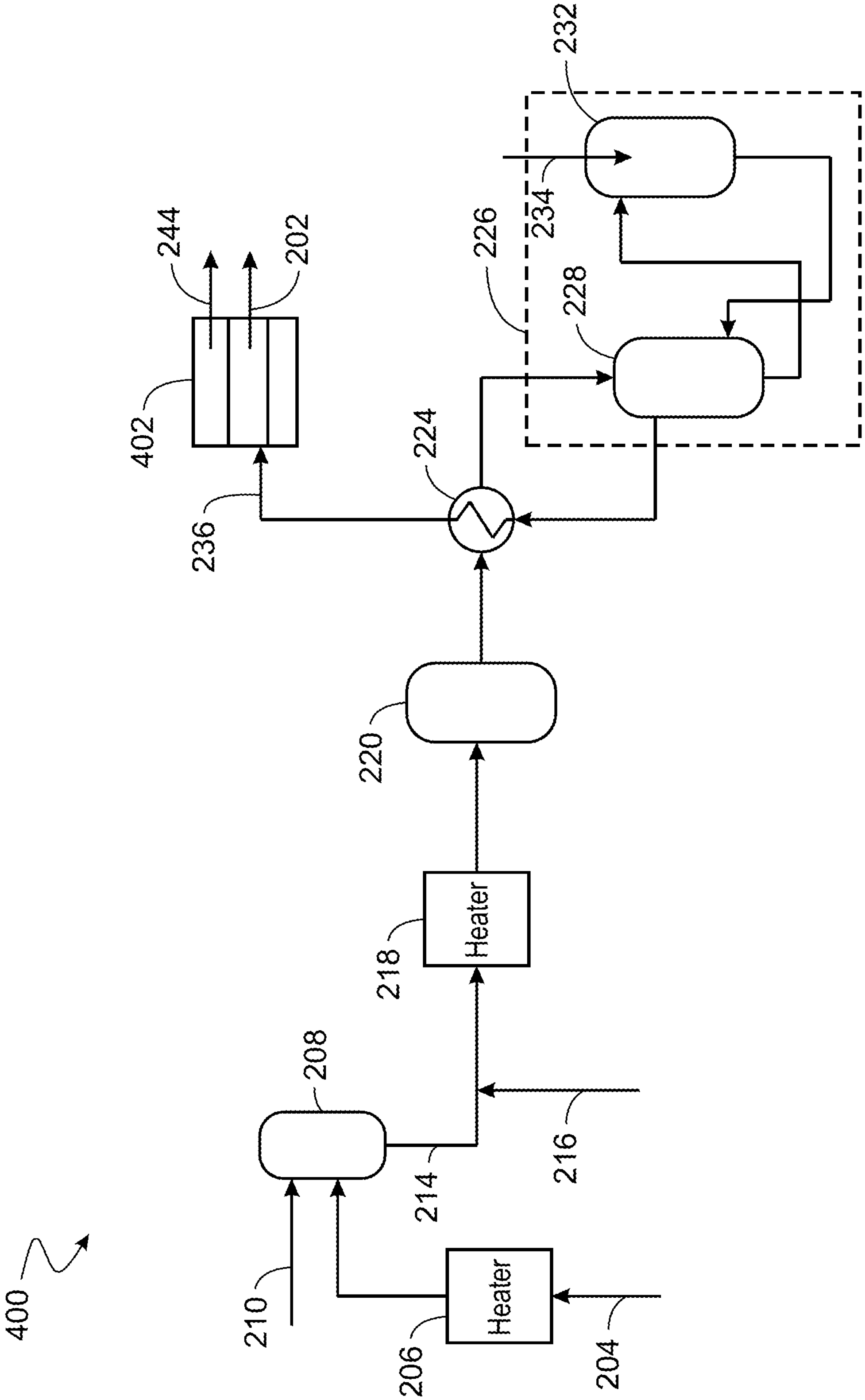
FIG. 4 is a simplified process flow diagram of an embodiment in which the hydrogen separation membrane is combined with the water gas shift reactor to form a membrane, high-temperature water-gas shift (HTWGS) reactor.

FIG. 4 is a simplified process flow diagram of an embodiment in which a hydrogen separation membrane is combined with a water gas shift reactor to form a membrane, high-temperature water-gas shift reactor (membrane-HTWGS) 402. Like numbered items are as described with respect to FIG. 2. The membrane-HTWGS 402 includes an in-situ membrane-based hydrogen separation in a water gas shift reactor. The input stream to the membrane-HTWGS 402 is the syngas stream 236 from the ATR 232. In the membrane-HTWGS 402, the carbon monoxide reacts with steam to form carbon dioxide and hydrogen. The hydrogen 202 that is produced is simultaneously separated through a selective hydrogen permeable membrane. As the product concentration is decreased, the forward reaction rate increased resulting in a higher overall conversion of carbon monoxide. This enables the system to obtain a pure stream of hydrogen 202 on the permeate side as well as the carbon dioxide 244 from the retentate side of the membrane-HTWGS 402. The carbon dioxide 244 is mixed with other contaminants isolated on the permeate side.

The membrane used in the membrane-HTWGS 402 has a bore or lumen. The bore is the permeate side of the tubular membrane. The membrane material may be, for example, palladium (Pd) or Pd alloy. In some embodiments, the membrane material, or wall, of the tubular membrane is thin, such as less than about 10 μm, or between about 2 μm and about 4 μm.

The membrane may be formed on a tubular support, such as a porous ceramic, with a hydrogen-selective membrane material disposed on the tubular support. Thus, the wall of the tubular membrane includes the tubular support and the membrane material. The membrane material of the tubular membrane may be, for example, palladium or palladium alloy. In various embodiments, the palladium alloy includes a palladium-platinum (Pd—Pt) alloy, a palladium-gold (Pd—Au) alloy, a palladium-ruthenium (Pd—Ru) alloy, or tertiary alloys of these elements, Pt, Au, or Ru with palladium. In some embodiments, the membrane material has a thickness of greater than about 2 microns or greater than about 3 microns, or in a range of between about 2 and about 20 microns, between about 3 and about 10 microns, or between about 3 and about 6 microns. The thickness of the membrane material may be less than about 30 microns, less than about 20 microns, or less than about 10 microns. As indicated, the membrane material may be disposed (e.g., deposited) on a tubular substrate such as a dense or porous tubular support that is ceramic or metallic with a ceramic interlayer.

Figure 5:
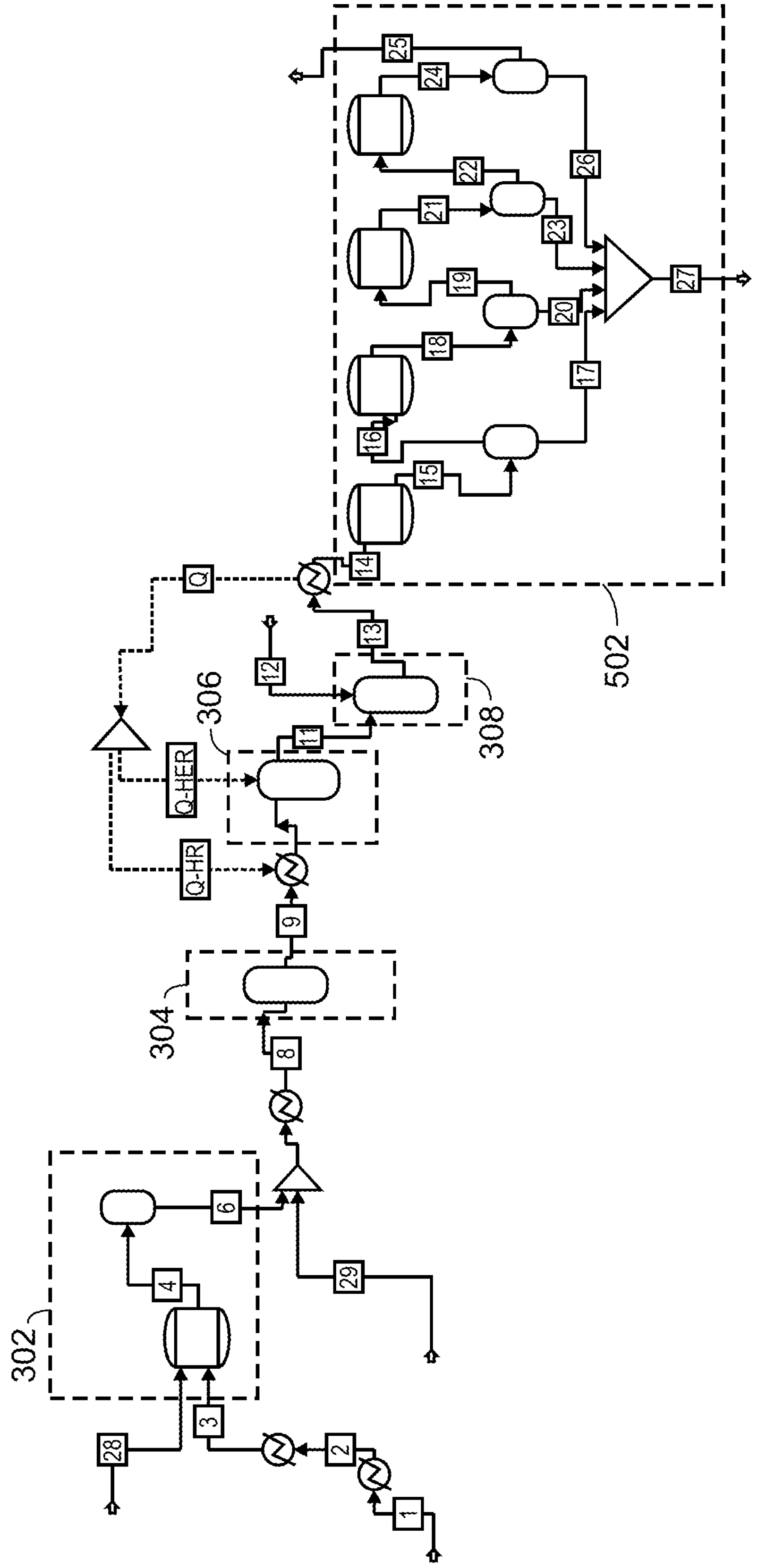
FIG. 5 is a drawing of the Aspen plus flowsheet of the system configuration of FIG. 4.

FIG. 5 is a drawing of the Aspen plus flowsheet of the system configuration of FIG. 4. Like numbered items are as described with respect to FIG. 3. The boxed labels shown in FIG. 5 correspond to the labeled columns in Tables 3A-3D, which show the properties of the stream. The heat duties of the major system components are listed in Table 4. The membrane-HTWGS 402 is modelled as a series 502 of stoichiometric reactors and hydrogen separators with a hydrogen recovery of 90%.

TABLE 4

Heat duties of major system components of configuration 2.

| Component | Heat duty (kW) |
|---|---|
| H1 | 11984 |
| H2 | 69.8 |
| H3 | 34636 |

TABLE 4-continued

Heat duties of major system components of configuration 2.

| Component | Heat duty (kW) |
|---|---|
| H4 (Q-HR) | 47955 |
| HER (Q-HER) | 50314 |
| H5 | −98270 |
| WGS | −12047 |
| WGS2 | −6017 |
| WGS3 | −3019 |
| WGS4 | −1497 |

Figure 6:
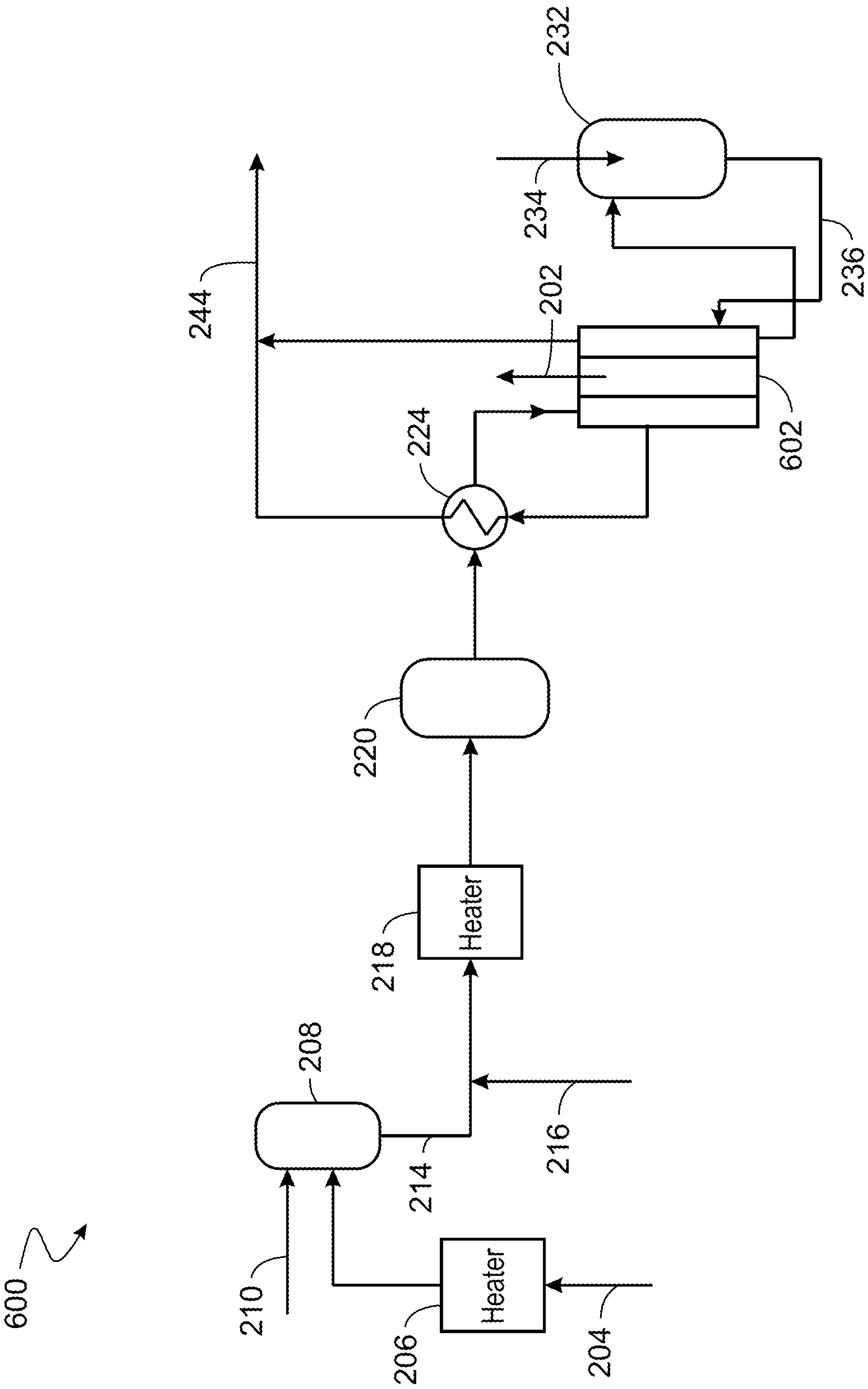
FIG. 6 is a simplified process flow diagram of a configuration that includes the integration of a membrane heat-exchanger reformer (membrane HER) with the autothermal reformer.

FIG. 6 is a simplified process flow diagram of a configuration 600 that includes the integration of a membrane heat-exchanger reformer (membrane HER) 602 with the ATR 232. Like numbered items are as described with respect to FIG. 2. The utilization of a membrane heat-exchanger reformer eliminates the water gas shift reactor. The integration with an autothermal reactor allows the utilization of waste heat to provide energy to the membrane heat-exchanger reformer for the endothermic reaction reactions.

Accordingly, this configuration allows simultaneous steam methane reforming reaction and membrane-based hydrogen separation. The unreacted reactants leaving the membrane HER 602 are sent to the ATR 232 where both exothermic partial oxidation and endothermic steam methane reforming take place. The syngas stream 236 from the ATR 232 provides thermal energy to the membrane HER 602. As hydrogen 202 is separated by a hydrogen permeable membrane and the membrane HER 602, a pure stream of hydrogen 202 is obtained from the membrane HER 602 at the permeate side. The retentate side of the reactor primarily includes carbon dioxide 244, mixed with unreacted steam and traces of carbon monoxide.

Figure 7:
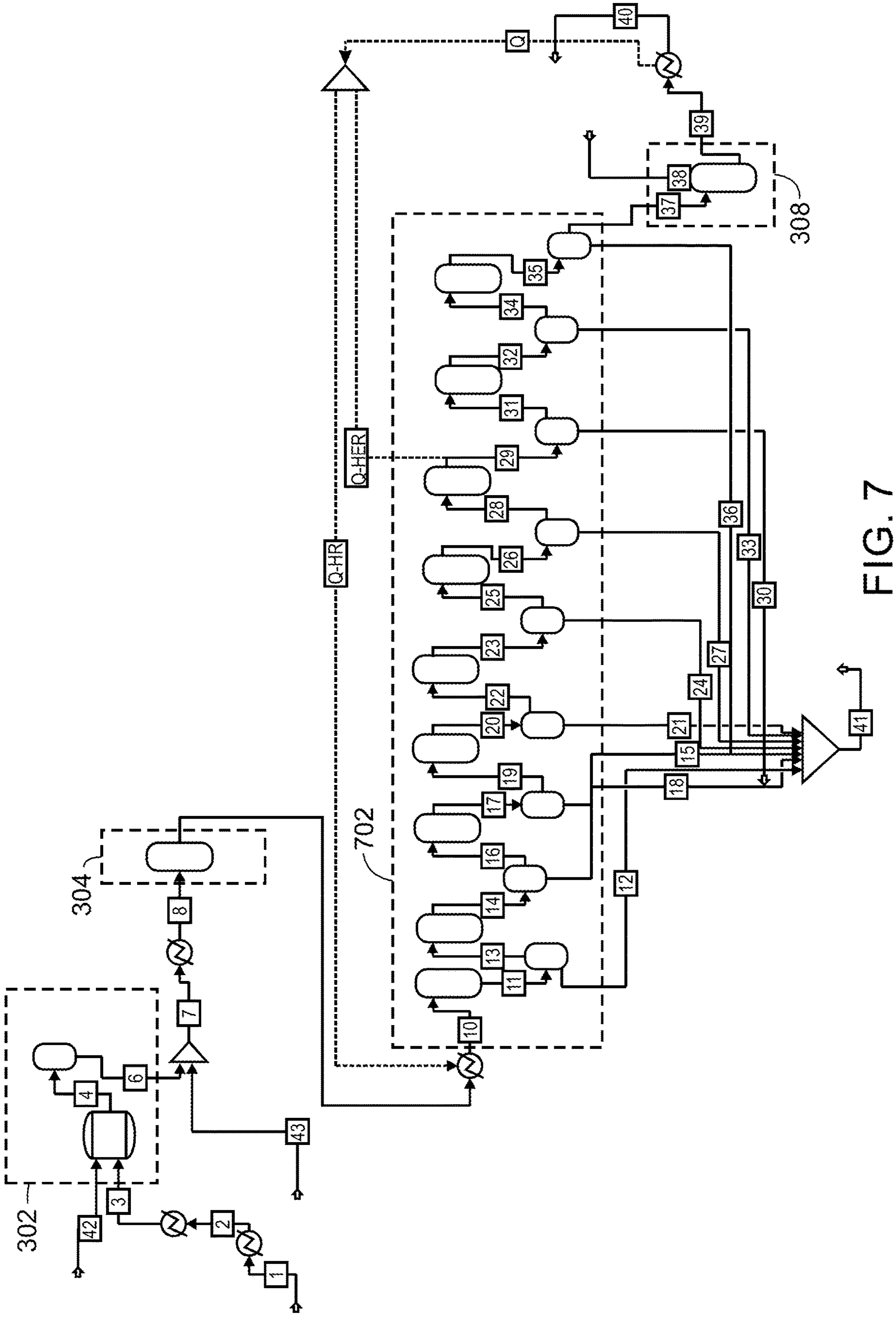
FIG. 7 is a drawing of the Aspen plus flowsheet of the system configuration of FIG. 6.

FIG. 7 is a drawing of the Aspen plus flowsheet of the system configuration of FIG. 6. Like numbered items are as described with respect to FIG. 3. The stream properties corresponding to the labels in FIG. 7 are shown in the correspondingly labeled columns of Tables 5A-5F. Table 6 lists the heat duties of major system components. The membrane HER is modelled as a series 702 of Gibbs equilibrium reactors and hydrogen separators with a recovery of about 90%.

TABLE 6

Heat duties of major system components of FIG. 7

| Component | Heat duty (kW) |
|---|---|
| H1 | 11984 |
| H2 | 69 |
| H3 | 34636 |

TABLE 6-continued

Heat duties of major system components of FIG. 7

| Component | Heat duty (kW) |
|---|---|
| H4 (Q-HR) | 34269 |
| MEMREAC1 | 40174 |
| MEMREAC2 | 30739 |
| MEMREAC3 | 25229 |
| MEMREAC4 | 21289 |
| MEMREAC5 | 18282 |
| MEMREAC6 | 15881 |
| MEMREAC7 | 13906 |
| MEMREAC8 | 12243 |
| MEMREAC9 | 10815 |
| H5 | −222082 |

Examples

Lab scale testing was completed using developed membranes and a high temperature water gas shift (WGS) catalyst, as described with respect to configuration 2 described with respect to FIG. 4. The water gas shift catalyst performance was validated with a membrane reactor. The feed was a simulated autothermal reformer (ATR) outlet, including 42.3 vol. % $H_2$, 10.9 vol. % CO, 6.3 vol % $CO_2$, and 38 vol % $H_2O$, with 2.5 vol % $N_2$ for analysis. The $H_2$ separation membrane, was formed from palladium-gold. The membrane used in the test was procured from a supplier in China (GaoQ). The membrane was palladium and gold with 25 wt. % gold and was supported on a porous stainless-steel support. It had an active membrane length of 19.2 cm and an outer diameter of 5 mm. The WGS catalyst had an 82 mL loading.

TABLE 7

Test conditions for validating water gas shift (WGS) catalyst performance with membrane reactor.

| No. | Condition | Catalyst Loading (mL) | T (° C.) | P (bar) | Flow (sccm) CO flow (mL/min) | $CO_2$ flow (mL/min) | $H_2O$ flow (mL/min) | $H_2$ flow (mL/min) | $N_2$ flow (mL/min) |
|---|---|---|---|---|---|---|---|---|---|
| 1 | GHSV = 2,428 $h^{-1}$ | 82 | 450-500 | 10-40 | 369.2 | 214.6 | 0.954 | 1430.7 | 25 |
| 2 | GHSV = 2,428 $h^{-1}$ | 82 | 450-500 | 10-40 | 184.6 | 107.3 | 0.477 | 715.4 | 25 |

Figure 8B:
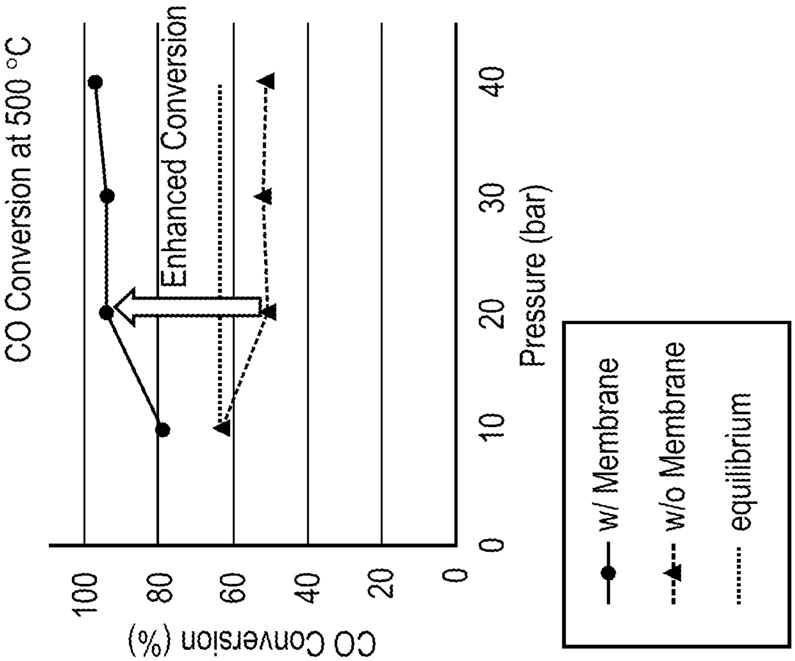
FIGS. 8A and 8B are plots of the performance of the membrane reactor.
Figure 8A:
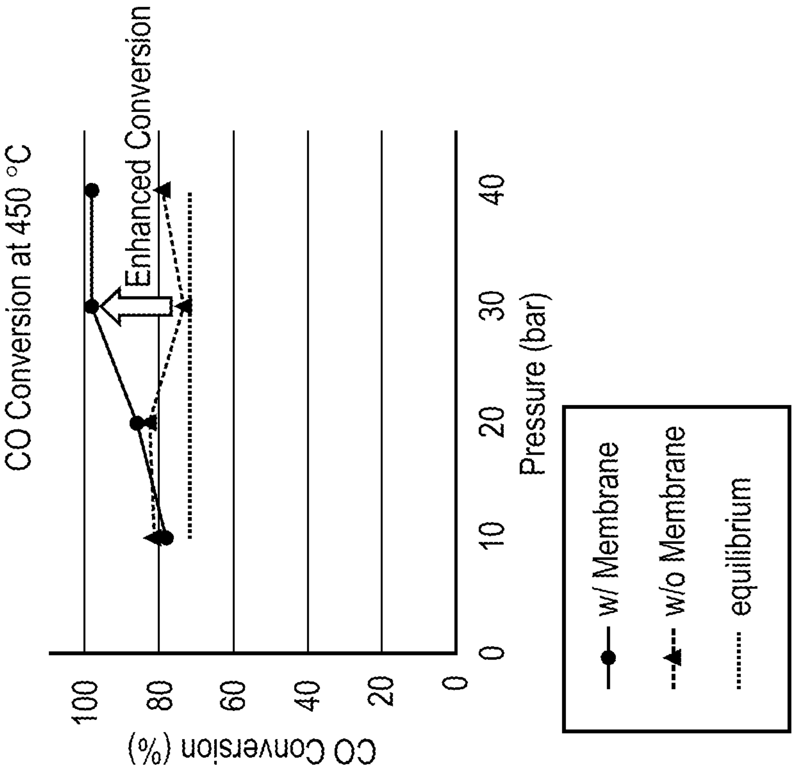

FIGS. 8A and 8B are plots of the performance of the membrane reactor. These indicate that the CO conversion was increased to higher than about 90 vol. % when using the membrane. Further, $H_2$ permeation and CO conversion were both improved at higher pressure conditions. While lower temperature was favored for the WGS reaction, methanation can also occur, creating contamination.

Figures 9A, 9B:
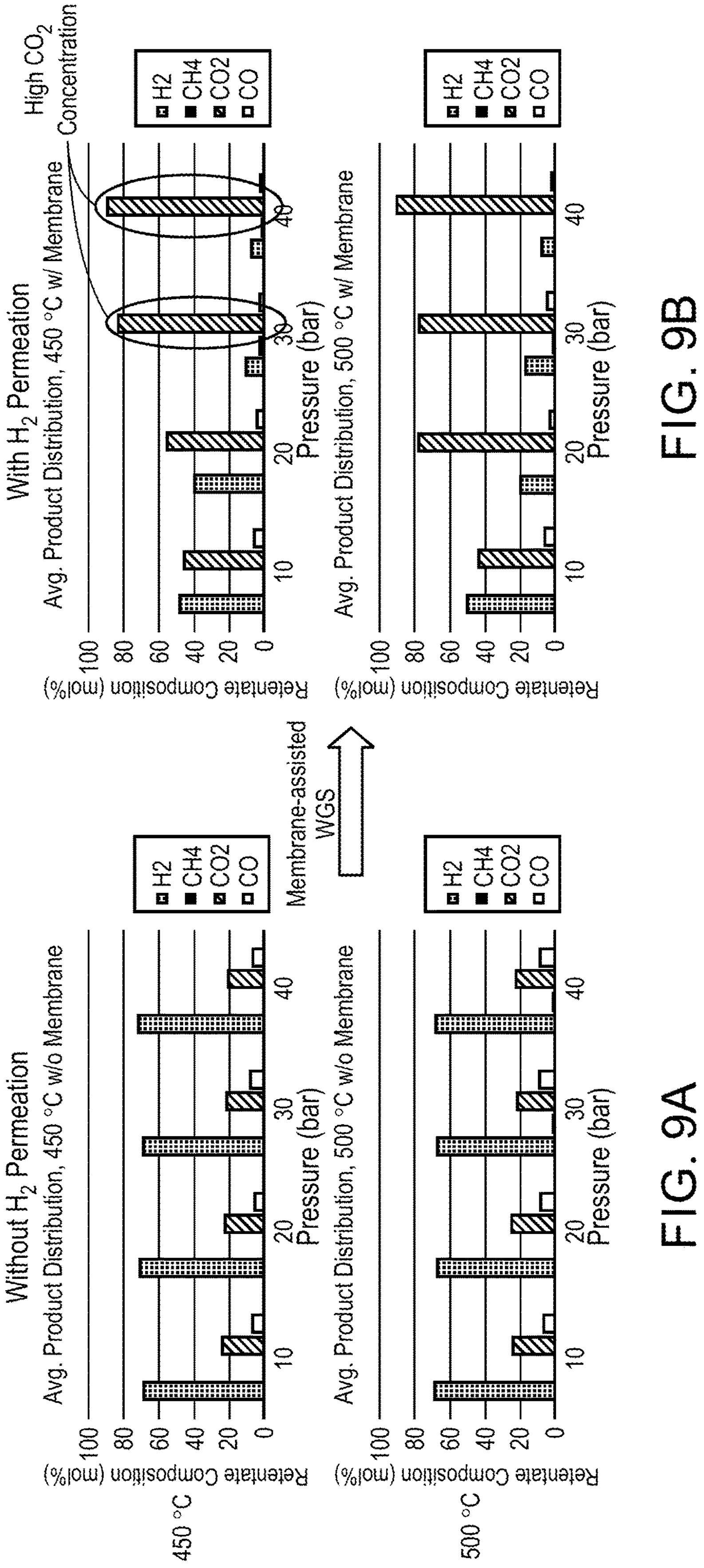
FIGS. 9A and 9B are plots showing the product distribution at the retentate outlet using the membrane assisted WGS.

FIGS. 9A and 9B are plots showing the product distribution at the retentate outlet using the membrane assisted WGS. As can be seen in these plots, the use of the membrane reactor shifts the reaction further from equilibrium, creating a higher concentration of carbon dioxide in the retentate stream, and increasing the yield of the process.

Figure 10B:
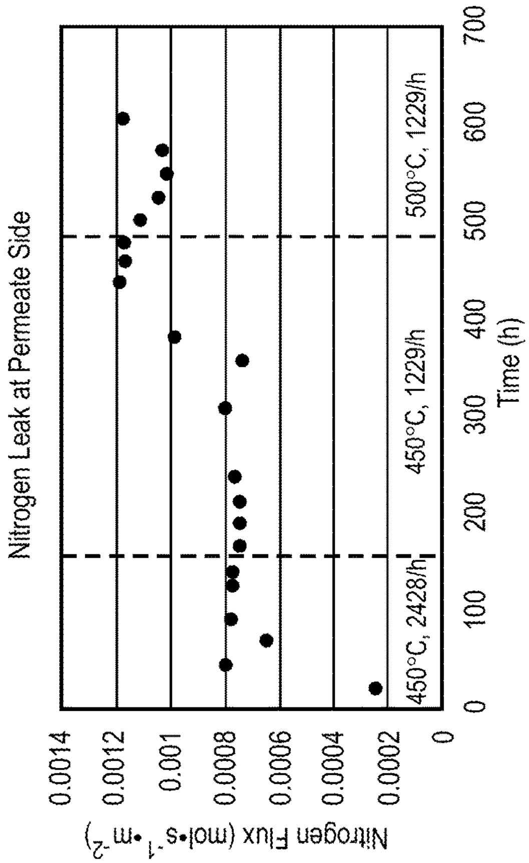
FIGS. 10A and 10B are plots showing the hydrogen purity at the permeate outlet using the membrane assisted WGS.
Figure 10A:
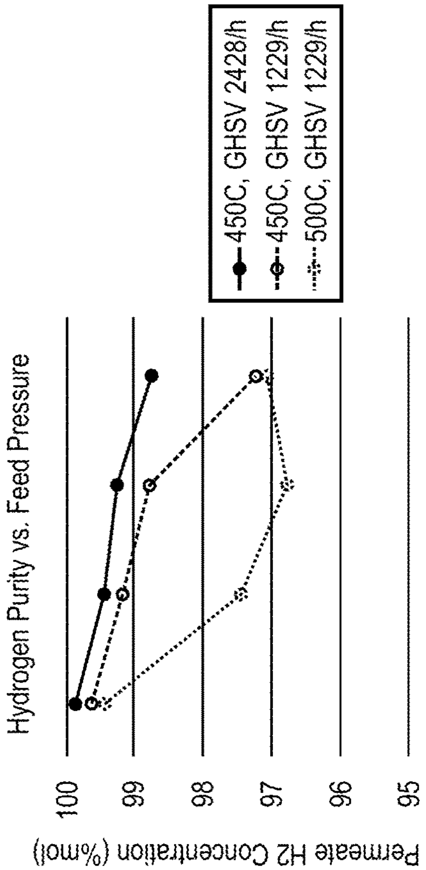

FIGS. 10A and 10B are plots showing the hydrogen purity at the permeate outlet using the membrane assisted WGS. As can be seen in FIG. 10A, the hydrogen purity at the permeate outlet was greater than about 99 vol. % at a pressure of 10 bar, and greater than about 96 vol. % for all conditions. The impurities included trace amounts of $CO_2$, CO, and $CH_4$.

The nitrogen leak rate is shown in FIG. 10B, with a 5 bar inlet pressure condition, which was performed to check the durability of the membrane. As used herein, the durability is the performance stability over reaction time. The nitrogen leak rate slightly increased over the greater than 600 hours of operation.

As shown by these results, the technical problem of providing thermal energy for endothermic steam-methane reforming without utilizing carbon-based fuels is solved through the integration of the heat-exchanger reformer with an autothermal reformer. The unreacted reactants leaving the HER firstly react in the autothermal reformer producing more hydrogen and the waste heat entailed in the exit stream of the autothermal reformer is utilized for the endothermic gas heated reformer. In addition, the membrane-based configurations developed in this invention also provide different methods for hydrogen separation. These include the in-situ separation of hydrogen in a membrane high temperature water gas shift reactor or in-situ hydrogen separation in a membrane reformer. Both configurations provide higher reaction rates and higher conversions while utilizing the waste heat entailed in the output stream of an integrated autothermal reformer. The input reactant stream of the autothermal reformer comprises the output product stream of the heat-exchanger reformer. Hence, this also allows the unreacted reactants leaving the gas heated reformer to react in the autothermal reformer to produce more hydrogen.

TABLE 1A

List of Aspen Plus flowsheet stream properties for FIG. 3.

| | Stream | 1 | 2 | 3 | 4 | 6 | 7 | 8 |
|---|---|---|---|---|---|---|---|---|
| Temperature | ° C. | 35 | 245 | 246 | 366 | 351 | 285 | 450 |
| Pressure | bar | 40 | 40 | 40 | 33 | 34 | 34 | 34 |
| Mole Fractions | | | | | | | | |
| CH4 | | 0.93680 | 0.93680 | 0.93680 | 0.93676 | 0.93679 | 0.24913 | 0.24913 |
| C3H8 | | 0.00307 | 0.00307 | 0.00307 | 0.00307 | 0.00307 | 0.00082 | 0.00082 |
| C2H6 | | 0.05783 | 0.05783 | 0.05783 | 0.05783 | 0.05783 | 0.01538 | 0.01538 |
| N-PEN-01 | | 0.00061 | 0.00061 | 0.00061 | 0.00061 | 0.00061 | 0.00016 | 0.00016 |
| N-HEX-01 | | 0.00016 | 0.00016 | 0.00016 | 0.00015 | 0.00015 | 0.00004 | 0.00004 |
| H2O | | 0.00000 | 0.00000 | 0.00000 | 0.00000 | 0.00000 | 0.73406 | 0.73406 |
| H2 | | 0.00000 | 0.00000 | 0.00000 | 0.00001 | 0.00001 | 0.00000 | 0.00000 |
| N2 | | 0.00150 | 0.00150 | 0.00150 | 0.00150 | 0.00150 | 0.00040 | 0.00040 |
| CO2 | | 0.00000 | 0.00000 | 0.00000 | 0.00000 | 0.00000 | 0.00000 | 0.00000 |
| CO | | 0.00000 | 0.00000 | 0.00000 | 0.00000 | 0.00000 | 0.00000 | 0.00000 |
| O2 | | 0.00000 | 0.00000 | 0.00000 | 0.00000 | 0.00000 | 0.00000 | 0.00000 |
| PROPY-01 | | 0.00000 | 0.00000 | 0.00000 | 0.00000 | 0.00000 | 0.00000 | 0.00000 |
| H2S | | 0.00000 | 0.00000 | 0.00000 | 0.00004 | 0.00000 | 0.00000 | 0.00000 |
| THIOPHEN | | 0.00004 | 0.00004 | 0.00004 | 0.00000 | 0.00000 | 0.00000 | 0.00000 |
| N-BUTANE | | 0.00000 | 0.00000 | 0.00000 | 0.00004 | 0.00004 | 0.00001 | 0.00001 |
| Mass Flows | kg/hr | 76654.7 | 76654.7 | 76654.7 | 76656.2 | 76650.1 | 300799.8 | 300799.8 |
| CH4 | kg/hr | 67744.1 | 67744.1 | 67744.1 | 67744.1 | 67744.1 | 67744.1 | 67744.1 |
| C3H8 | kg/hr | 609.4 | 609.4 | 609,4 | 609.4 | 609.4 | 609.4 | 609.4 |
| C2H6 | kg/hr | 7838.4 | 7838.4 | 7838.4 | 7838.4 | 7838.4 | 7838.4 | 7838.4 |
| N-PEN-01 | kg/hr | 198.0 | 198.0 | 198.0 | 198.0 | 198.0 | 198.0 | 198.0 |
| N-HEX-01 | kg/hr | 60.2 | 60.2 | 60.2 | 60.2 | 60.2 | 60.2 | 60.2 |
| H2O | kg/hr | 0.0 | 0.0 | 0.0 | 0.0 | 0.0 | 224149.7 | 224149.7 |
| H2 | kg/hr | 0.0 | 0.0 | 0.0 | 0.1 | 0.1 | 0.1 | 0.1 |
| N2 | kg/hr | 189.4 | 189.4 | 189.4 | 189.4 | 189.4 | 189.4 | 189.4 |
| CO2 | kg/hr | 0.0 | 0.0 | 0.0 | 0.0 | 0.0 | 0.0 | 0.0 |
| CO | kg/hr | 0.0 | 0.0 | 0.0 | 0.0 | 0.0 | 0.0 | 0.0 |
| O2 | kg/hr | 0.0 | 0.0 | 0.0 | 0.0 | 0.0 | 0.0 | 0.0 |
| PROPY-01 | kg/hr | 0.0 | 0.0 | 0.0 | 0.0 | 0.0 | 0.0 | 0.0 |
| H2S | kg/hr | 0.0 | 0.0 | 0.0 | 6.1 | 0.0 | 0.0 | 0.0 |
| THIOPHEN | kg/hr | 15.2 | 15.2 | 15.2 | 0.0 | 0.0 | 0.0 | 0.0 |
| N-BUTANE | kg/hr | 0.0 | 0.0 | 0.0 | 10.5 | 10.5 | 10.5 | 10.5 |

TABLE 1B

List of Aspen Plus flowsheet stream properties for FIG. 3.

| | Stream | 9 | 10 | 11 | 12 |
|---|---|---|---|---|---|
| Temperature | ° C. | 405 | 684 | 684 | 25 |
| Pressure | bar | 30 | 30 | 30 | 30 |
| Mole Fractions | | | | | |
| CH4 | | 0.25727 | 0.25727 | 0.15178 | 0.00000 |
| C3H8 | | 0.00000 | 0.00000 | 0.00000 | 0.00000 |
| C2H6 | | 0.00000 | 0.00000 | 0.00001 | 0.00000 |
| N-PEN-01 | | 0.00000 | 0.00000 | 0.00000 | 0.00000 |
| N-HEX-01 | | 0.00000 | 0.00000 | 0.00000 | 0.00000 |
| H2O | | 0.67628 | 0.67628 | 0.46544 | 0.00000 |
| H2 | | 0.04937 | 0.04937 | 0.29842 | 0.00000 |
| N2 | | 0.00039 | 0.00039 | 0.00033 | 0.00000 |
| CO2 | | 0.01658 | 0.01658 | 0.06127 | 0.00000 |
| CO | | 0.00011 | 0.00011 | 0.02274 | 0.00000 |
| O2 | | 0.00000 | 0.00000 | 0.00000 | 1.00000 |
| PROPY-01 | | 0.00000 | 0.00000 | 0.00000 | 0.00000 |
| H2S | | 0.00000 | 0.00000 | 0.00000 | 0.00000 |
| THIOPHEN | | 0.00000 | 0.00000 | 0.00000 | 0.00000 |
| N-BUTANE | | 0.00000 | 0.00000 | 0.00000 | 0.00000 |
| Mass Flows | kg/hr | 300799.8 | 300799.8 | 300799.8 | 60797.7 |
| CH4 | kg/hr | 72374.1 | 72374.1 | 49608.2 | 0.0 |
| C3H8 | kg/hr | 0.0 | 0.0 | 0.0 | 0.0 |
| C2H6 | kg/hr | 2.1 | 2.1 | 5.8 | 0.0 |
| N-PEN-01 | kg/hr | 0.0 | 0.0 | 0.0 | 0.0 |
| N-HEX-01 | kg/hr | 0.0 | 0.0 | 0.0 | 0.0 |
| H2O | kg/hr | 213638.0 | 213638.0 | 170828.0 | 0.0 |
| H2 | kg/hr | 1745.1 | 1745.1 | 12256.1 | 0.0 |
| N2 | kg/hr | 189.4 | 189.4 | 189.4 | 0.0 |
| CO2 | kg/hr | 12797.4 | 12797.4 | 54936.3 | 0.0 |
| CO | kg/hr | 53.8 | 53.8 | 12976.1 | 0.0 |
| O2 | kg/hr | 0.0 | 0.0 | 0.0 | 60797.7 |
| PROPY-01 | kg/hr | 0.0 | 0.0 | 0.0 | 0.0 |
| H2S | kg/hr | 0.0 | 0.0 | 0.0 | 0.0 |
| THIOPHEN | kg/hr | 0.0 | 0.0 | 0.0 | 0.0 |
| N-BUTANE | kg/hr | 0.0 | 0.0 | 0.0 | 0.0 |

| | Stream | 13 | 14 | 15 | 16 |
|---|---|---|---|---|---|
| Temperature | ° C. | 948 | 410 | 450 | 450 |
| Pressure | bar | 30 | 30 | 30 | 1 |
| Mole Fractions | | | | | |
| CH4 | | 0.00632 | 0.00632 | 0.00632 | 0.00000 |
| C3H8 | | 0.00000 | 0.00000 | 0.00000 | 0.00000 |
| C2H6 | | 0.00000 | 0.00000 | 0.00000 | 0.00000 |
| N-PEN-01 | | 0.00000 | 0.00000 | 0.00000 | 0.00000 |
| N-HEX-01 | | 0.00000 | 0.00000 | 0.00000 | 0.00000 |
| H2O | | 0.37651 | 0.37651 | 0.29453 | 0.00000 |
| H2 | | 0.44005 | 0.44005 | 0.52204 | 1.00000 |
| N2 | | 0.00026 | 0.00026 | 0.00026 | 0.00000 |
| CO2 | | 0.06592 | 0.06592 | 0.14791 | 0.00000 |
| CO | | 0.11094 | 0.11094 | 0.02896 | 0.00000 |
| O2 | | 0.00000 | 0.00000 | 0.00000 | 0.00000 |
| PROPY-01 | | 0.00000 | 0.00000 | 0.00000 | 0.00000 |
| H2S | | 0.00000 | 0.00000 | 0.00000 | 0.00000 |
| THIOPHEN | | 0.00000 | 0.00000 | 0.00000 | 0.00000 |
| N-BUTANE | | 0.00000 | 0.00000 | 0.00000 | 0.00000 |
| Mass Flows | kg/hr | 361597.5 | 361597.5 | 361597.5 | 26018.4 |
| CH4 | kg/hr | 2657.5 | 2657.5 | 2657.5 | 0.0 |
| C3H8 | kg/hr | 0.0 | 0.0 | 0.0 | 0.0 |
| C2H6 | kg/hr | 0.1 | 0.1 | 0.1 | 0.0 |
| N-PEN-01 | kg/hr | 0.0 | 0.0 | 0.0 | 0.0 |
| N-HEX-01 | kg/hr | 0.0 | 0.0 | 0.0 | 0.0 |
| H2O | kg/hr | 177896.5 | 177896.5 | 139160.5 | 0.0 |
| H2 | kg/hr | 23265.6 | 23265.6 | 27600.1 | 26018.4 |
| N2 | kg/hr | 189.4 | 189.4 | 189.4 | 0.0 |
| CO2 | kg/hr | 76090.1 | 76090.1 | 170718.9 | 0.0 |
| CO | kg/hr | 81498.3 | 81498.3 | 21271.1 | 0.0 |
| O2 | kg/hr | 0.0 | 0.0 | 0.0 | 0.0 |
| PROPY-01 | kg/hr | 0.0 | 0.0 | 0.0 | 0.0 |
| H2S | kg/hr | 0.0 | 0.0 | 0.0 | 0.0 |
| THIOPHEN | kg/hr | 0.0 | 0.0 | 0.0 | 0.0 |
| N-BUTANE | kg/hr | 0.0 | 0.0 | 0.0 | 0.0 |

TABLE 1C

List of Aspen Plus flowsheet stream properties for FIG. 3.

| | Stream | 17 | 18 | 19 |
|---|---|---|---|---|
| Temperature | ° C. | 450 | 373 | 283 |
| Pressure | bar | 30 | 9 | 56 |
| Mole Fractions | | | | |
| CH4 | | 0.01244 | 0.00000 | 0.00000 |
| C3H8 | | 0.00000 | 0.00000 | 0.00000 |
| C2H6 | | 0.00000 | 0.00000 | 0.00000 |
| N-PEN -01 | | 0.00000 | 0.00000 | 0.00000 |
| N-HEX -01 | | 0.00000 | 0.00000 | 0.00000 |
| H2O | | 0.57992 | 0.00000 | 1.00000 |
| H2 | | 0.05890 | 1.00000 | 0.00000 |
| N2 | | 0.00051 | 0.00000 | 0.00000 |
| CO2 | | 0.29122 | 0.00000 | 0.00000 |
| CO | | 0.05701 | 0.00000 | 0.00000 |
| O2 | | 0.00000 | 0.00000 | 0.00000 |
| PROPY-01 | | 0.00000 | 0.00000 | 0.00000 |
| H2S | | 0.00000 | 0.00000 | 0.00000 |
| THIOPHEN | | 0.00000 | 0,00000 | 0.00000 |

TABLE 1C-continued

List of Aspen Plus flowsheet stream properties for FIG. 3.

| | Stream | 17 | 18 | 19 |
|---|---|---|---|---|
| N-BUTANE | | 0.00000 | 0.00000 | 0.00000 |
| Mass Flows | kg/hr | 335579.1 | 1.5 | 224149.7 |
| CH4 | kg/hr | 2657.5 | 0.0 | 0.0 |
| C3H8 | kg/hr | 0.0 | 0.0 | 0.0 |
| C2H6 | kg/hr | 0.1 | 0.0 | 0.0 |
| N-PEN-01 | kg/hr | 0.0 | 0.0 | 0.0 |
| N-HEX -01 | kg/hr | 0.0 | 0.0 | 0.0 |
| H2O | kg/hr | 139160.5 | 0.0 | 224149.7 |
| H2 | kg/hr | 1581.7 | 1.5 | 0.0 |
| N2 | kg/hr | 189.4 | 0.0 | 0.0 |
| CO2 | kg/hr | 170718.9 | 0.0 | 0.0 |
| CO | kg/hr | 21271.1 | 0.0 | 0.0 |
| O2 | kg/hr | 0.0 | 0.0 | 0.0 |
| PROPY-01 | kg/hr | 0.0 | 0.0 | 0.0 |
| H2S | kg/hr | 0.0 | 0.0 | 0.0 |
| THIOPHEN | kg/hr | 0.0 | 0.0 | 0.0 |
| N-BUTANE | kg/hr | 0.0 | 0.0 | 0.0 |

TABLE 3A

List of Aspen Plus flowsheet stream properties for FIG. 5.

| | Stream | 1 | 2 | 3 | 4 | 6 | 7 | 8 |
|---|---|---|---|---|---|---|---|---|
| Temperature | ° C. | 35 | 245 | 246.0914 | 366 | 351 | 284.93869 | 450 |
| Pressure | bar | 40 | 40 | 40 | 33.4 | 33.767461 | 33.767461 | 33.767461 |
| Mole Fractions | | | | | | | | |
| CH4 | | 0.93680 | 0.93680 | 0.93680 | 0.93676 | 0.93679 | 0.24913 | 0.24913 |
| C3H8 | | 0.00307 | 0.00307 | 0.00307 | 0.00307 | 0.00307 | 0.00082 | 0.00082 |
| C2H6 | | 0.05783 | 0.05783 | 0.05783 | 0.05783 | 0.05783 | 0.01538 | 0.01538 |
| N-PEN-01 | | 0.00061 | 0.00061 | 0.00061 | 0.00061 | 0.00061 | 0.00016 | 0.00016 |
| N-HEX-01 | | 0.00016 | 0.00016 | 0.00016 | 0.00015 | 0.00015 | 0.00004 | 0.00004 |
| H2O | | 0.00000 | 0.00000 | 0.00000 | 0.00000 | 0.00000 | 0.73406 | 0.73406 |
| H2 | | 0.00000 | 0.00000 | 0.00000 | 0.00001 | 0.00001 | 0.00000 | 0.00000 |
| N2 | | 0.00150 | 0.00150 | 0.00150 | 0.00150 | 0.00150 | 0.00040 | 0.00040 |
| CO2 | | 0.00000 | 0.00000 | 0.00000 | 0.00000 | 0.00000 | 0.00000 | 0.00000 |
| CO | | 0.00000 | 0.00000 | 0.00000 | 0.00000 | 0.00000 | 0.00000 | 0.00000 |
| O2 | | 0.00000 | 0.00000 | 0.00000 | 0.00000 | 0.00000 | 0.00000 | 0.00000 |
| PROPY-01 | | 0.00000 | 0.00000 | 0.00000 | 0.00000 | 0.00000 | 0.00000 | 0.00000 |
| H2S | | 0.00000 | 0.00000 | 0.00000 | 0.00004 | 0.00000 | 0.00000 | 0.00000 |
| THIOPHEN | | 0.00004 | 0.00004 | 0.00004 | 0.00000 | 0.00000 | 0.00000 | 0.00000 |
| N-BUTANE | | 0.00000 | 0.00000 | 0.00000 | 0.00004 | 0.00004 | 0.00001 | 0.00001 |
| Mass Flows | kg/hr | 76654.72 | 76654.72 | 76654.72 | 76656.23 | 76650.09 | 300799.81 | 300799.81 |
| CH4 | kg/hr | 67744.08 | 67744.08 | 67744.08 | 67744.08 | 67744.08 | 67744.08 | 67744.08 |
| C3H8 | kg/hr | 609.43 | 609.43 | 609.43 | 609.43 | 609.43 | 609.43 | 609.43 |
| C2H6 | kg/hr | 7838.39 | 7838.39 | 7838.39 | 7838.39 | 7838.39 | 7838.39 | 7838.39 |
| N-PEN-01 | kg/hr | 198.03 | 198.03 | 198.03 | 198.03 | 198.03 | 198.03 | 198.03 |
| N-HEX-01 | kg/hr | 60.21 | 60.21 | 60.21 | 60.21 | 60.21 | 60.21 | 60.21 |
| H2O | kg/hr | 0.00 | 0.00 | 0.00 | 0.00 | 0.00 | 224149.72 | 224149.72 |
| H2 | kg/hr | 0.00 | 0.00 | 0.00 | 0.06 | 0.06 | 0.06 | 0.06 |
| N2 | kg/hr | 189.41 | 189.41 | 189.41 | 189.41 | 189.41 | 189.41 | 189.41 |
| CO2 | kg/hr | 0.00 | 0.00 | 0.00 | 0.00 | 0.00 | 0.00 | 0.00 |
| CO | kg/hr | 0.00 | 0.00 | 0.00 | 0.00 | 0.00 | 0.00 | 0.00 |
| O2 | kg/hr | 0.00 | 0.00 | 0.00 | 0.00 | 0.00 | 0.00 | 0.00 |
| PROPY-01 | kg/hr | 0.00 | 0.00 | 0.00 | 0.00 | 0.00 | 0.00 | 0.00 |
| H2S | kg/hr | 0.00 | 0.00 | 0.00 | 6.15 | 0.00 | 0.00 | 0.00 |
| THIOPHEN | kg/hr | 15.17 | 15.17 | 15.17 | 0.00 | 0.00 | 0.00 | 0.00 |
| N-BUTANE | kg/hr | 0.00 | 0.00 | 0.00 | 10.48 | 10.48 | 10.48 | 10.48 |

TABLE 3B

List of Aspen Plus flowsheet stream properties for FIG. 5.

| | Stream | 9 | 10 | 11 | 12 | 13 |
|---|---|---|---|---|---|---|
| Temperature | ° C. | 405.1496 | 621.2461 | 620.7020 | 25 | 870.8258 |
| Pressure | bar | 30 | 30 | 30 | 30 | 30 |
| Mole Fractions | | | | | | |
| CH4 | | 0.25727 | 0.25727 | 0.18528 | 0.00000 | 0.01977 |
| C3H8 | | 0.00000 | 0.00000 | 0.00000 | 0.00000 | 0.00000 |
| C2H6 | | 0.00000 | 0.00000 | 0.00001 | 0.00000 | 0.00000 |
| N-PEN-01 | | 0.00000 | 0.00000 | 0.00000 | 0.00000 | 0.00000 |
| N-HEX-01 | | 0.00000 | 0.00000 | 0.00000 | 0.00000 | 0.00000 |
| H2O | | 0.67628 | 0.67628 | 0.52646 | 0.00000 | 0.39226 |
| H2 | | 0.04937 | 0.04937 | 0.22527 | 0.00000 | 0.41943 |
| N2 | | 0.00039 | 0.00039 | 0.00035 | 0.00000 | 0.00026 |
| CO2 | | 0.01658 | 0.01658 | 0.05302 | 0.00000 | 0.07514 |
| CO | | 0.00011 | 0.00011 | 0.00961 | 0.00000 | 0.09314 |
| O2 | | 0.00000 | 0.00000 | 0.00000 | 1.00000 | 0.00000 |
| PROPY-01 | | 0.00000 | 0.00000 | 0.00000 | 0.00000 | 0.00000 |
| H2S | | 0.00000 | 0.00000 | 0.00000 | 0.00000 | 0.00000 |
| THIOPHEN | | 0.00000 | 0.00000 | 0.00000 | 0.00000 | 0.00000 |
| N-BUTANE | | 0.00000 | 0.00000 | 0.00000 | 0.00000 | 0.00000 |
| Mass Flows | kg/hr | 300799.81 | 300799.81 | 300799.81 | 60765.72 | 361565.53 |
| CH4 | kg/hr | 72374.06 | 72374.06 | 57596.40 | 0.00 | 8102.03 |
| C3H8 | kg/hr | 0.00 | 0.00 | 0.00 | 0.00 | 0.00 |
| C2H6 | kg/hr | 2.10 | 2.10 | 5.63 | 0.00 | 0.40 |
| N-PEN-01 | kg/hr | 0.00 | 0.00 | 0.00 | 0.00 | 0.00 |
| N-HEX-01 | kg/hr | 0.00 | 0.00 | 0.00 | 0.00 | 0.00 |
| H2O | kg/hr | 213637.99 | 213637.99 | 183777.71 | 0.00 | 180539.53 |
| H2 | kg/hr | 1745.08 | 1745.08 | 8799.51 | 0.00 | 21601.51 |
| N2 | kg/hr | 189.41 | 189.41 | 189.41 | 0.00 | 189.41 |
| CO2 | kg/hr | 12797.39 | 12797.39 | 45214.56 | 0.00 | 84482.08 |
| CO | kg/hr | 53.77 | 53.77 | 5216.57 | 0.00 | 66650.57 |
| O2 | kg/hr | 0.00 | 0.00 | 0.00 | 60765.72 | 0.00 |
| PROPY-01 | kg/hr | 0.00 | 0.00 | 0.00 | 0.00 | 0.00 |
| H2S | kg/hr | 0.00 | 0.00 | 0.00 | 0.00 | 0.00 |
| THIOPHEN | kg/hr | 0.00 | 0.00 | 0.00 | 0.00 | 0.00 |
| N-BUTANE | kg/hr | 0.00 | 0.00 | 0.00 | 0.00 | 0.00 |

| | Stream | 14 | 15 | 16 |
|---|---|---|---|---|
| Temperature | ° C. | 500 | 500 | 500 |
| Pressure | bar | 30 | 30 | 30 |
| Mole Fractions | | | | |
| CH4 | | 0.01977 | 0.01977 | 0.03403 |
| C3H8 | | 0.00000 | 0.00000 | 0.00000 |
| C2H6 | | 0.00000 | 0.00000 | 0.00000 |
| N-PEN-01 | | 0.00000 | 0.00000 | 0.00000 |
| N-HEX-01 | | 0.00000 | 0.00000 | 0.00000 |
| H2O | | 0.39226 | 0.34597 | 0.59563 |
| H2 | | 0.41943 | 0.46572 | 0.08018 |
| N2 | | 0.00026 | 0.00026 | 0.00046 |
| CO2 | | 0.07514 | 0.12143 | 0.20905 |
| CO | | 0.09314 | 0.04685 | 0.08065 |
| O2 | | 0.00000 | 0.00000 | 0.00000 |
| PROPY-01 | | 0.00000 | 0.00000 | 0.00000 |
| H2S | | 0.00000 | 0.00000 | 0.00000 |
| THIOPHEN | | 0.00000 | 0.00000 | 0.00000 |
| N-BUTANE | | 0.00000 | 0.00000 | 0.00000 |
| Mass Flows | kg/hr | 361565.53 | 361565.53 | 339978.57 |
| CH4 | kg/hr | 8102.03 | 8102.03 | 8102.03 |
| C3H8 | kg/hr | 0.00 | 0.00 | 0.00 |
| C2H6 | kg/hr | 0.40 | 0.40 | 0.40 |
| N-PEN-01 | kg/hr | 0.00 | 0.00 | 0.00 |
| N-HEX-01 | kg/hr | 0.00 | 0.00 | 0.00 |
| H2O | kg/hr | 180539.53 | 159234.51 | 159234.51 |
| H2 | kg/hr | 21601.51 | 23985.51 | 2398.55 |
| N2 | kg/hr | 189.41 | 189.41 | 189.41 |
| CO2 | kg/hr | 84482.08 | 136528.44 | 136528.44 |
| CO | kg/hr | 66650.57 | 33525.24 | 33525.24 |
| O2 | kg/hr | 0.00 | 0.00 | 0.00 |
| PROPY-01 | kg/hr | 0.00 | 0.00 | 0.00 |
| H2S | kg/hr | 0.00 | 0.00 | 0.00 |
| THIOPHEN | kg/hr | 0.00 | 0.00 | 0.00 |
| N-BUTANE | kg/hr | 0.00 | 0.00 | 0.00 |

TABLE 3C

List of Aspen Plus flowsheet stream properties for FIG. 5.

| | Stream | 17 | 18 | 19 | 20 | 21 | 22 | 23 | 24 |
|---|---|---|---|---|---|---|---|---|---|
| Temperature | ° C. | 500 | 500 | 500 | 500 | 500 | 500 | 500 | 500 |
| Pressure | bar | 30 | 30 | 30 | 30 | 30 | 30 | 30 | 30 |
| Mole Fractions | | | | | | | | | |
| CH4 | | 0.00000 | 0.03403 | 0.03816 | 0.00000 | 0.03816 | 0.03944 | 0.00000 | 0.03944 |
| C3H8 | | 0.00000 | 0.00000 | 0.00000 | 0.00000 | 0.00000 | 0.00000 | 0.00000 | 0.00000 |
| C2H6 | | 0.00000 | 0.00000 | 0.00000 | 0.00000 | 0.00000 | 0.00000 | 0.00000 | 0.00000 |
| N-PEN-01 | | 0.00000 | 0.00000 | 0.00000 | 0.00000 | 0.00000 | 0.00000 | 0.00000 | 0.00000 |
| N-HEX-01 | | 0.00000 | 0.00000 | 0.00000 | 0.00000 | 0.00000 | 0.00000 | 0.00000 | 0.00000 |
| H2O | | 0.00000 | 0.55552 | 0.62296 | 0.00000 | 0.60036 | 0.62052 | 0.00000 | 0.60893 |
| H2 | | 1.00000 | 0.12028 | 0.01349 | 1.00000 | 0.03609 | 0.00373 | 1.00000 | 0.01531 |
| N2 | | 0.00000 | 0.00046 | 0.00051 | 0.00000 | 0.00051 | 0.00053 | 0.00000 | 0.00053 |
| CO2 | | 0.00000 | 0.24915 | 0.27940 | 0.00000 | 0.30200 | 0.31214 | 0.00000 | 0.32372 |
| CO | | 0.00000 | 0.04055 | 0.04548 | 0.00000 | 0.02287 | 0.02364 | 0.00000 | 0.01206 |
| O2 | | 0.00000 | 0.00000 | 0.00000 | 0.00000 | 0.00000 | 0.00000 | 0.00000 | 0.00000 |
| PROPY-01 | | 0.00000 | 0.00000 | 0.00000 | 0.00000 | 0.00000 | 0.00000 | 0.00000 | 0.00000 |
| H2S | | 0.00000 | 0.00000 | 0.00000 | 0.00000 | 0.00000 | 0.00000 | 0.00000 | 0.00000 |
| THIOPHEN | | 0.00000 | 0.00000 | 0.00000 | 0.00000 | 0.00000 | 0.00000 | 0.00000 | 0.00000 |
| N-BUTANE | | 0.00000 | 0.00000 | 0.00000 | 0.00000 | 0.00000 | 0.00000 | 0.00000 | 0.00000 |
| Mass Flows | kg/hr | 21586.96 | 339978.57 | 336740.21 | 3238.37 | 336740.21 | 335873.73 | 866.48 | 335873.73 |
| CH4 | kg/hr | 0.00 | 8102.03 | 8102.03 | 0.00 | 8102.03 | 8102.03 | 0.00 | 8102.03 |
| C3H8 | kg/hr | 0.00 | 0.00 | 0.00 | 0.00 | 0.00 | 0.00 | 0.00 | 0.00 |
| C2H6 | kg/hr | 0.00 | 0.40 | 0.40 | 0.00 | 0.40 | 0.40 | 0.00 | 0.40 |
| N-PEN-01 | kg/hr | 0.00 | 0.00 | 0.00 | 0.00 | 0.00 | 0.00 | 0.00 | 0.00 |
| N-HEX-01 | kg/hr | 0.00 | 0.00 | 0.00 | 0.00 | 0.00 | 0.00 | 0.00 | 0.00 |
| H2O | kg/hr | 0.00 | 148513.78 | 148513.78 | 0.00 | 143125.56 | 143125.56 | 0.00 | 140453.46 |
| H2 | kg/hr | 21586.96 | 3598.18 | 359.82 | 3238.37 | 962.75 | 96.28 | 866.48 | 395.28 |
| N2 | kg/hr | 0.00 | 189.41 | 189.41 | 0.00 | 189.41 | 189.41 | 0.00 | 189.41 |
| CO2 | kg/hr | 0.00 | 162718.29 | 162718.29 | 0.00 | 175881.25 | 175881.25 | 0.00 | 182408.96 |
| CO | kg/hr | 0.00 | 16856.49 | 16856.49 | 0.00 | 8478.81 | 8478.81 | 0.00 | 4324.20 |
| O2 | kg/hr | 0.00 | 0.00 | 0.00 | 0.00 | 0.00 | 0.00 | 0.00 | 0.00 |
| PROPY-01 | kg/hr | 0.00 | 0.00 | 0.00 | 0.00 | 0.00 | 0.00 | 0.00 | 0.00 |
| H25 | kg/hr | 0.00 | 0.00 | 0.00 | 0.00 | 0.00 | 0.00 | 0.00 | 0.00 |
| THIOPHEN | kg/hr | 0.00 | 0.00 | 0.00 | 0.00 | 0.00 | 0.00 | 0.00 | 0.00 |
| N-BUTANE | kg/hr | 0.00 | 0.00 | 0.00 | 0.00 | 0.00 | 0.00 | 0.00 | 0.00 |

TABLE 3D

List of Aspen Plus flowsheet stream properties for FIG. 5.

| | Stream | 25 | 26 | 27 | 28 | 29 |
|---|---|---|---|---|---|---|
| Temperature | ° C. | 500 | 500 | 500 | 373 | 283 |
| Pressure | bar | 30 | 30 | 30 | 9 | 55.63629 |
| Mole Fractions | | | | | | |
| CH4 | | 0.04000 | 0.00000 | 0.00000 | 0.00000 | 0.00000 |
| C3H8 | | 0.00000 | 0.00000 | 0.00000 | 0.00000 | 0.00000 |
| C2H6 | | 0.00000 | 0.00000 | 0.00000 | 0.00000 | 0.00000 |
| N-PEN-01 | | 0.00000 | 0.00000 | 0.00000 | 0.00000 | 0.00000 |
| N-HEX-01 | | 0.00000 | 0.00000 | 0.00000 | 0.00000 | 0.00000 |
| H2O | | 0.61744 | 0.00000 | 0.00000 | 0.00000 | 1.00000 |
| H2 | | 0.00155 | 1.00000 | 1.00000 | 1.00000 | 0.00000 |
| N2 | | 0.00054 | 0.00000 | 0.00000 | 0.00000 | 0.00000 |
| CO2 | | 0.32825 | 0.00000 | 0.00000 | 0.00000 | 0.00000 |
| CO | | 0.01223 | 0.00000 | 0.00000 | 0.00000 | 0.00000 |
| O2 | | 0.00000 | 0.00000 | 0.00000 | 0.00000 | 0.00000 |
| PROPY-01 | | 0.00000 | 0.00000 | 0.00000 | 0.00000 | 0.00000 |
| H2S | | 0.00000 | 0.00000 | 0.00000 | 0.00000 | 0.00000 |
| THIOPHEN | | 0.00000 | 0.00000 | 0.00000 | 0.00000 | 0.00000 |
| N-BUTANE | | 0.00000 | 0.00000 | 0.00000 | 0.00000 | 0.00000 |
| Mass Flows | kg/hr | 335517.98 | 355.75 | 26047.55 | 1.51 | 224149.72 |
| CH4 | kg/hr | 8102.03 | 0.00 | 0.00 | 0.00 | 0.00 |
| C3H8 | kg/hr | 0.00 | 0.00 | 0.00 | 0.00 | 0.00 |
| C2H6 | kg/hr | 0.40 | 0.00 | 0.00 | 0.00 | 0.00 |
| N-PEN-01 | kg/hr | 0.00 | 0.00 | 0.00 | 0.00 | 0.00 |
| N-HEX-01 | kg/hr | 0.00 | 0.00 | 0.00 | 0.00 | 0.00 |
| H2O | kg/hr | 140453.46 | 0.00 | 0.00 | 0.00 | 224149.72 |
| H2 | kg/hr | 39.53 | 355.75 | 26047.55 | 1.51 | 0.00 |
| N2 | kg/hr | 189.41 | 0.00 | 0.00 | 0.00 | 0.00 |
| CO2 | kg/hr | 182408.96 | 0.00 | 0.00 | 0.00 | 0.00 |
| CO | kg/hr | 4324.20 | 0.00 | 0.00 | 0.00 | 0.00 |

TABLE 3D-continued

List of Aspen Plus flowsheet stream properties for FIG. 5.

| | Stream | 25 | 26 | 27 | 28 | 29 |
|---|---|---|---|---|---|---|
| O2 | kg/hr | 0.00 | 0.00 | 0.00 | 0.00 | 0.00 |
| PROPY-01 | kg/hr | 0.00 | 0.00 | 0.00 | 0.00 | 0.00 |
| H2S | kg/hr | 0.00 | 0.00 | 0.00 | 0.00 | 0.00 |
| THIOPHEN | kg/hr | 0.00 | 0.00 | 0.00 | 0.00 | 0.00 |
| N-BUTANE | kg/hr | 0.00 | 0.00 | 0.00 | 0.00 | 0.00 |

TABLE 5A

List of Aspen Plus flowsheet stream properties for FIG. 7.

| | Stream | 1 | 2 | 3 | 4 | 6 | 7 | 8 |
|---|---|---|---|---|---|---|---|---|
| Temperature | ° C. | 35 | 245 | 246.0913 | 366 | 351 | 285.185556 | 450 |
| Pressure | bar | 40 | 40 | 40 | 33.4 | 33.767461 | 33.767461 | 33.767461 |
| Mole Fractions | | | | | | | | |
| CH4 | | 0.93680 | 0.93680 | 0.93680 | 0.93676 | 0.93680 | 0.24913 | 0.24913 |
| C3H8 | | 0.00307 | 0.00307 | 0.00307 | 0.00307 | 0.00307 | 0.00082 | 0.00082 |
| C2H6 | | 0.05783 | 0.05783 | 0.05783 | 0.05783 | 0.05783 | 0.01538 | 0.01538 |
| N-PEN-01 | | 0.00061 | 0.00061 | 0.00061 | 0.00061 | 0.00061 | 0.00016 | 0.00016 |
| N-HEX-01 | | 0.00015 | 0.00015 | 0.00015 | 0.00015 | 0.00015 | 0.00004 | 0.00004 |
| H2O | | 0.00000 | 0.00000 | 0.00000 | 0.00000 | 0.00000 | 0.73406 | 0.73406 |
| H2 | | 0.00000 | 0.00000 | 0.00000 | 0.00001 | 0.00001 | 0.00000 | 0.00000 |
| N2 | | 0.00150 | 0.00150 | 0.00150 | 0.00150 | 0.00150 | 0.00040 | 0.00040 |
| CO2 | | 0.00000 | 0.00000 | 0.00000 | 0.00000 | 0.00000 | 0.00000 | 0.00000 |
| CO | | 0.00000 | 0.00000 | 0.00000 | 0.00000 | 0.00000 | 0.00000 | 0.00000 |
| O2 | | 0.00000 | 0.00000 | 0.00000 | 0.00000 | 0.00000 | 0.00000 | 0.00000 |
| PROPY-01 | | 0.00000 | 0.00000 | 0.00000 | 0.00000 | 0.00000 | 0.00000 | 0.00000 |
| H2S | | 0.00000 | 0.00000 | 0.00000 | 0.00004 | 0.00000 | 0.00000 | 0.00000 |
| THIOPHEN | | 0.00004 | 0.00004 | 0.00004 | 0.00000 | 0.00000 | 0.00000 | 0.00000 |
| N-BUTANE | | 0.00000 | 0.00000 | 0.00000 | 0.00004 | 0.00004 | 0.00001 | 0.00001 |
| Mass Flows | kg/hr | 76653.4 | 76653.4 | 76653.4 | 76654.9 | 76648.8 | 300798.5 | 300798.5 |
| CH4 | kg/hr | 67744.3 | 67744.3 | 67744.3 | 67744.3 | 67744.3 | 67744.3 | 67744.3 |
| C3H8 | kg/hr | 609.4 | 609.4 | 609.4 | 609.4 | 609.4 | 609.4 | 609.4 |
| C2H6 | kg/hr | 7838.4 | 7838.4 | 7838.4 | 7838.4 | 7838.4 | 7838.4 | 7838.4 |
| N-PEN-01 | kg/hr | 198.4 | 198.4 | 198.4 | 198.4 | 198.4 | 198.4 | 198.4 |
| N-HEX-01 | kg/hr | 58.3 | 58.3 | 58.3 | 58.3 | 58.3 | 58.3 | 58.3 |
| H2O | kg/hr | 0.0 | 0.0 | 0.0 | 0.0 | 0.0 | 224149.7 | 224149.7 |
| H2 | kg/hr | 0.0 | 0.0 | 0.0 | 0.1 | 0.1 | 0.1 | 0.1 |
| N2 | kg/hr | 189.4 | 189.4 | 189.4 | 189.4 | 189.4 | 189.4 | 189.4 |
| CO2 | kg/hr | 0.0 | 0.0 | 0.0 | 0.0 | 0.0 | 0.0 | 0.0 |
| CO | kg/hr | 0.0 | 0.0 | 0.0 | 0.0 | 0.0 | 0.0 | 0.0 |
| O2 | kg/hr | 0.0 | 0.0 | 0.0 | 0.0 | 0.0 | 0.0 | 0.0 |
| PROPY-01 | kg/hr | 0.0 | 0.0 | 0.0 | 0.0 | 0.0 | 0.0 | 0.0 |
| H2S | kg/hr | 0.0 | 0.0 | 0.0 | 6.1 | 0.0 | 0.0 | 0.0 |
| THIOPHEN | kg/hr | 15.2 | 15.2 | 15.2 | 0.0 | 0.0 | 0.0 | 0.0 |
| N-BUTANE | kg/hr | 0.0 | 0.0 | 0.0 | 10.5 | 10.5 | 10.5 | 10.5 |

TABLE 5B

List of Aspen Plus flowsheet stream properties for FIG. 7.

| | Stream | 9 | 10 | 11 | 12 |
|---|---|---|---|---|---|
| Temperature | ° C. | 410.6319 | 566 | 580 | 580 |
| Pressure | bar | 30 | 30 | 30 | 30 |
| Mole Fractions | | | | | |
| CH4 | | 0.25727 | 0.25727 | 0.20377 | 0.00000 |
| C3H8 | | 0.00000 | 0.00000 | 0.00000 | 0.00000 |
| C2H6 | | 0.00000 | 0.00000 | 0.00001 | 0.00000 |
| N-PEN-01 | | 0.00000 | 0.00000 | 0.00000 | 0.00000 |
| N-HEX-01 | | 0.00000 | 0.00000 | 0.00000 | 0.00000 |
| H2O | | 0.67628 | 0.67628 | 0.56280 | 0.00000 |
| H2 | | 0.04937 | 0.04937 | 0.18223 | 1.00000 |
| N2 | | 0.00039 | 0.00039 | 0.00036 | 0.00000 |
| CO2 | | 0.01658 | 0.01658 | 0.04582 | 0.00000 |
| CO | | 0.00011 | 0.00011 | 0.00501 | 0.00000 |
| O2 | | 0.00000 | 0.00000 | 0.00000 | 0.00000 |

TABLE 5B-continued

| List of Aspen Plus flowsheet stream properties for FIG. 7. | | | | | |
|---|---|---|---|---|---|
| PROPY-01 | | 0.00000 | 0.00000 | 0.00000 | 0.00000 |
| H2S | | 0.00000 | 0.00000 | 0.00000 | 0.00000 |
| THIOPHEN | | 0.00000 | 0.00000 | 0.00000 | 0.00000 |
| N-BUTANE | | 0.00000 | 0.00000 | 0.00000 | 0.00000 |
| Mass Flows | kg/hr | 300798.5 | 300798.5 | 300798.5 | 6238.2 |
| CH4 | kg/hr | 72373.0 | 72373.0 | 61680.4 | 0.0 |
| C3H8 | kg/hr | 0.0 | 0.0 | 0.0 | 0.0 |
| C2H6 | kg/hr | 2.1 | 2.1 | 5.1 | 0.0 |
| N-PEN-01 | kg/hr | 0.0 | 0.0 | 0.0 | 0.0 |
| N-HEX-01 | kg/hr | 0.0 | 0.0 | 0.0 | 0.0 |
| H2O | kg/hr | 213638.9 | 213638.9 | 191300.4 | 0.0 |
| H2 | kg/hr | 1745.1 | 1745.1 | 6931.3 | 6238.2 |
| N2 | kg/hr | 189.4 | 189.4 | 189.4 | 0.0 |
| CO2 | kg/hr | 12796.3 | 12796.3 | 38043.4 | 0.0 |
| CO | kg/hr | 53.8 | 53.8 | 2648.5 | 0.0 |
| O2 | kg/hr | 0.0 | 0.0 | 0.0 | 0.0 |
| PROPY-01 | kg/hr | 0.0 | 0.0 | 0.0 | 0.0 |
| H2S | kg/hr | 0.0 | 0.0 | 0.0 | 0.0 |
| THIOPHEN | kg/hr | 0.0 | 0.0 | 0.0 | 0.0 |
| N-BUTANE | kg/hr | 0.0 | 0.0 | 0.0 | 0.0 |
| | Stream | 13 | 14 | 15 | 16 |
| Temperature | ° C. | 580 | 580 | 580 | 580 |
| Pressure | bar | 30 | 30 | 30 | 30 |
| Mole Fractions | | | | | |
| CH4 | | 0.24375 | 0.19300 | 0.00000 | 0.22421 |
| C3H8 | | 0.00000 | 0.00000 | 0.00000 | 0.00000 |
| C2H6 | | 0.00001 | 0.00001 | 0.00000 | 0.00001 |
| N-PEN-01 | | 0.00000 | 0.00000 | 0.00000 | 0.00000 |
| N-HEX-01 | | 0.00000 | 0.00000 | 0.00000 | 0.00000 |
| H2O | | 0.67321 | 0.56119 | 0.00000 | 0.65192 |
| H2 | | 0.02180 | 0.15463 | 1.00000 | 0.01796 |
| N2 | | 0.00043 | 0.00040 | 0.00000 | 0.00046 |
| CO2 | | 0.05480 | 0.08303 | 0.00000 | 0.09646 |
| CO | | 0.00599 | 0.00773 | 0.00000 | 0.00898 |
| O2 | | 0.00000 | 0.00000 | 0.00000 | 0.00000 |
| PROPY-01 | | 0.00000 | 0.00000 | 0.00000 | 0.00000 |
| H2S | | 0.00000 | 0.00000 | 0.00000 | 0.00000 |
| THIOPHEN | | 0.00000 | 0.00000 | 0.00000 | 0.00000 |
| N-BUTANE | | 0.00000 | 0.00000 | 0.00000 | 0.00000 |
| Mass Flows | kg/hr | 294560.4 | 294560.4 | 4749.2 | 289811.2 |
| CH4 | kg/hr | 61680.4 | 52415.3 | 0.0 | 52415.3 |
| C3H8 | kg/hr | 0.0 | 0.0 | 0.0 | 0.0 |
| C2H6 | kg/hr | 5.1 | 4.9 | 0.0 | 4.9 |
| N-PEN-01 | kg/hr | 0.0 | 0.0 | 0.0 | 0.0 |
| N-HEX-01 | kg/hr | 0.0 | 0.0 | 0.0 | 0.0 |
| H2O | kg/hr | 191300.4 | 171145.9 | 0.0 | 171145.9 |
| H2 | kg/hr | 693.1 | 5276.9 | 4749.2 | 527.7 |
| N2 | kg/hr | 189.4 | 189.4 | 0.0 | 189.4 |
| CO2 | kg/hr | 38043.4 | 61861.6 | 0.0 | 61861.6 |
| CO | kg/hr | 2648.5 | 3666.3 | 0.0 | 3666.3 |
| O2 | kg/hr | 0.0 | 0.0 | 0.0 | 0.0 |
| PROPY-01 | kg/hr | 0.0 | 0.0 | 0.0 | 0.0 |
| H2S | kg/hr | 0.0 | 0.0 | 0.0 | 0.0 |
| THIOPHEN | kg/hr | 0.0 | 0.0 | 0.0 | 0.0 |
| N-BUTANE | kg/hr | 0.0 | 0.0 | 0.0 | 0.0 |

TABLE 5C

| List of Aspen Plus flowsheet stream properties for FIG. 7. | | | | | | | | | |
|---|---|---|---|---|---|---|---|---|---|
| | Stream | 17 | 18 | 19 | 20 | 21 | 22 | 23 | 24 |
| Temperature | ° C. | 580 | 580 | 580 | 580 | 580 | 580 | 580 | 580 |
| Pressure | bar | 30 | 30 | 30 | 30 | 30 | 30 | 30 | 30 |
| Mole Fractions | | | | | | | | | |
| CH4 | | 0.17989 | 0.00000 | 0.20532 | 0.16602 | 0.00000 | 0.18706 | 0.15187 | 0.00000 |
| C3H8 | | 0.00000 | 0.00000 | 0.00000 | 0.00000 | 0.00000 | 0.00000 | 0.00000 | 0.00000 |
| C2H6 | | 0.00001 | 0.00000 | 0.00001 | 0.00001 | 0.00000 | 0.00001 | 0.00001 | 0.00000 |
| N-PEN-01 | | 0.00000 | 0.00000 | 0.00000 | 0.00000 | 0.00000 | 0.00000 | 0.00000 | 0.00000 |

TABLE 5C-continued

List of Aspen Plus flowsheet stream properties for FIG. 7.

| | Stream | 17 | 18 | 19 | 20 | 21 | 22 | 23 | 24 |
|---|---|---|---|---|---|---|---|---|---|
| N-HEX-01 | | 0.00000 | 0.00000 | 0.00000 | 0.00000 | 0.00000 | 0.00000 | 0.00000 | 0.00000 |
| H2O | | 0.55247 | 0.00000 | 0.63056 | 0.54098 | 0.00000 | 0.60956 | 0.52814 | 0.00000 |
| H2 | | 0.13761 | 1.00000 | 0.01571 | 0.12500 | 1.00000 | 0.01408 | 0.11478 | 1.00000 |
| N2 | | 0.00044 | 0.00000 | 0.00050 | 0.00047 | 0.00000 | 0.00053 | 0.00050 | 0.00000 |
| CO2 | | 0.11952 | 0.00000 | 0.13642 | 0.15539 | 0.00000 | 0.17509 | 0.19070 | 0.00000 |
| CO | | 0.01006 | 0.00000 | 0.01148 | 0.01213 | 0.00000 | 0.01367 | 0.01400 | 0.00000 |
| O2 | | 0.00000 | 0.00000 | 0.00000 | 0.00000 | 0.00000 | 0.00000 | 0.00000 | 0.00000 |
| PROPY-01 | | 0.00000 | 0.00000 | 0.00000 | 0.00000 | 0.00000 | 0.00000 | 0.00000 | 0.00000 |
| H2S | | 0.00000 | 0.00000 | 0.00000 | 0.00000 | 0.00000 | 0.00000 | 0.00000 | 0.00000 |
| THIOPHEN | | 0.00000 | 0.00000 | 0.00000 | 0.00000 | 0.00000 | 0.00000 | 0.00000 | 0.00000 |
| N-BUTANE | | 0.00000 | 0.00000 | 0.00000 | 0.00000 | 0.00000 | 0.00000 | 0.00000 | 0.00000 |
| Mass Flows | kg/hr | 289811.2 | 3875.4 | 285935.8 | 285935.8 | 3266.2 | 282669.5 | 282669.5 | 2805.4 |
| CH4 | kg/hr | 44797.2 | 0.0 | 44797.2 | 38359.6 | 0.0 | 38359.6 | 32824.8 | 0.0 |
| C3H8 | kg/hr | 0.0 | 0.0 | 0.0 | 0.0 | 0.0 | 0.0 | 0.0 | 0.0 |
| C2H6 | kg/hr | 4.4 | 0.0 | 4.4 | 3.8 | 0.0 | 3.8 | 3.2 | 0.0 |
| N-PEN-01 | kg/hr | 0.0 | 0.0 | 0.0 | 0.0 | 0.0 | 0.0 | 0.0 | 0.0 |
| N-HEX-01 | kg/hr | 0.0 | 0.0 | 0.0 | 0.0 | 0.0 | 0.0 | 0.0 | 0.0 |
| H2O | kg/hr | 154490.8 | 0.0 | 154490.8 | 140365.6 | 0.0 | 140365.6 | 128183.8 | 0.0 |
| H2 | kg/hr | 4306.0 | 3875.4 | 430.6 | 3629.2 | 3266.2 | 362.9 | 3117.1 | 2805.4 |
| N2 | kg/hr | 189.4 | 0.0 | 189.4 | 189.4 | 0.0 | 189.4 | 189.4 | 0.0 |
| CO2 | kg/hr | 81648.8 | 0.0 | 81648.8 | 98493.5 | 0.0 | 98493.5 | 113067.4 | 0.0 |
| CO | kg/hr | 4374.6 | 0.0 | 4374.6 | 4894.6 | 0.0 | 4894.6 | 5283.8 | 0.0 |
| O2 | kg/hr | 0.0 | 0.0 | 0.0 | 0.0 | 0.0 | 0.0 | 0.0 | 0.0 |
| PROPY-01 | kg/hr | 0.0 | 0.0 | 0.0 | 0.0 | 0.0 | 0.0 | 0.0 | 0.0 |
| H2S | kg/hr | 0.0 | 0.0 | 0.0 | 0.0 | 0.0 | 0.0 | 0.0 | 0.0 |
| THIOPHEN | kg/hr | 0.0 | 0.0 | 0.0 | 0.0 | 0.0 | 0.0 | 0.0 | 0.0 |
| N-BUTANE | kg/hr | 0.0 | 0.0 | 0.0 | 0.0 | 0.0 | 0.0 | 0.0 | 0.0 |

TABLE 5D

List of Aspen Plus flowsheet stream properties for FIG. 7.

| | Stream | 25 | 26 | 27 | 28 |
|---|---|---|---|---|---|
| Temperature | ° C. | 580 | 580 | 580 | 580 |
| Pressure | bar | 30 | 30 | 30 | 30 |
| Mole Fractions | | | | | |
| CH4 | | 0.16937 | 0.13769 | 0.00000 | 0.15222 |
| C3H8 | | 0.00000 | 0.00000 | 0.00000 | 0.00000 |
| C2H6 | | 0.00001 | 0.00001 | 0.00000 | 0.00001 |
| N-PEN-01 | | 0.00000 | 0.00000 | 0.00000 | 0.00000 |
| N-HEX-01 | | 0.00000 | 0.00000 | 0.00000 | 0.00000 |
| H2O | | 0.58898 | 0.51459 | 0.00000 | 0.56888 |
| H2 | | 0.01280 | 0.10604 | 1.00000 | 0.01172 |
| N2 | | 0.00056 | 0.00053 | 0.00000 | 0.00059 |
| CO2 | | 0.21267 | 0.22545 | 0.00000 | 0.24923 |
| CO | | 0.01561 | 0.01569 | 0.00000 | 0.01735 |
| O2 | | 0.00000 | 0.00000 | 0.00000 | 0.00000 |
| PROPY-01 | | 0.00000 | 0.00000 | 0.00000 | 0 |
| H2S | | 0.00000 | 0.00000 | 0.00000 | 0.00000 |
| THIOPHEN | | 0.00000 | 0.00000 | 0.00000 | 0.00000 |
| N-BUTANE | | 0.00000 | 0.00000 | 0.00000 | 0.00000 |
| Mass Flows | kg/hr | 279864.1 | 279864.1 | 2439.6 | 277424.5 |
| CH4 | kg/hr | 32824.8 | 28010.9 | 0.0 | 28010.9 |
| C3H8 | kg/hr | 0.0 | 0.0 | 0.0 | 0.0 |
| C2H6 | kg/hr | 3.2 | 2.7 | 0.0 | 2.7 |
| N-PEN-01 | kg/hr | 0.0 | 0.0 | 0.0 | 0.0 |
| N-HEX-01 | kg/hr | 0.0 | 0.0 | 0.0 | 0.0 |
| H2O | kg/hr | 128183.8 | 117557.6 | 0.0 | 117557.6 |
| H2 | kg/hr | 311.7 | 2710.7 | 2439.6 | 271.1 |
| N2 | kg/hr | 189.4 | 189.4 | 0.0 | 189.4 |
| CO2 | kg/hr | 113067.4 | 125819.0 | 0.0 | 125819.0 |
| CO | kg/hr | 5283.8 | 5573.9 | 0.0 | 5573.9 |
| O2 | kg/hr | 0.0 | 0.0 | 0.0 | 0.0 |

TABLE 5D-continued

| List of Aspen Plus flowsheet stream properties for FIG. 7. | | | | | |
|---|---|---|---|---|---|
| PROPY-01 | kg/hr | 0.0 | 0.0 | 0.0 | 0.0 |
| H2S | kg/hr | 0.0 | 0.0 | 0.0 | 0.0 |
| THIOPHEN | kg/hr | 0.0 | 0.0 | 0.0 | 0.0 |
| N-BUTANE | kg/hr | 0.0 | 0.0 | 0.0 | 0.0 |
| | Stream | 29 | 30 | 31 | 32 |
| Temperature | ° C. | 580 | 580 | 580 | 580 |
| Pressure | bar | 30 | 30 | 30 | 30 |
| Mole Fractions | | | | | |
| CH4 | | 0.12361 | 0.00000 | 0.13561 | 0.10974 |
| C3H8 | | 0.00000 | 0.00000 | 0.00000 | 0.00000 |
| C2H6 | | 0.00001 | 0.00000 | 0.00001 | 0.00001 |
| N-PEN-01 | | 0.00000 | 0.00000 | 0.00000 | 0.00000 |
| N-HEX-01 | | 0.00000 | 0.00000 | 0.00000 | 0.00000 |
| H2O | | 0.50069 | 0.00000 | 0.54929 | 0.48669 |
| H2 | | 0.09831 | 1.00000 | 0.01078 | 0.09129 |
| N2 | | 0.00056 | 0.00000 | 0.00062 | 0.00059 |
| CO2 | | 0.25961 | 0.00000 | 0.28481 | 0.29312 |
| CO | | 0.01721 | 0.00000 | 0.01888 | 0.01856 |
| O2 | | 0.00000 | 0.00000 | 0.00000 | 0.00000 |
| PROPY-01 | | .00000 | 0.00000 | 0.00000 | 0.00000 |
| H2S | | 0.00000 | 0.00000 | 0.00000 | 0.00000 |
| THIOPHEN | | 0.00000 | 0.00000 | 0.00000 | 0.00000 |
| N-BUTANE | | 0.00000 | 0.00000 | 0.00000 | 0.00000 |
| Mass Flows | kg/hr | 277424.5 | 2139.7 | 275284.8 | 275284.8 |
| CH4 | kg/hr | 23790.4 | 0.0 | 23790.4 | 20069.7 |
| C3H8 | kg/hr | 0.0 | 0.0 | 0.0 | 0.0 |
| C2H6 | kg/hr | 2.2 | 0.0 | 2.2 | 1.8 |
| N-PEN-01 | kg/hr | 0.0 | 0.0 | 0.0 | 0.0 |
| N-HEX-01 | kg/hr | 0.0 | 0.0 | 0.0 | 0.0 |
| H2O | kg/hr | 108212.9 | 0.0 | 108212.9 | 99947.1 |
| H2 | kg/hr | 2377.5 | 2139.7 | 237.7 | 2097.8 |
| N2 | kg/hr | 189.4 | 0.0 | 189.4 | 189.4 |
| CO2 | kg/hr | 137067.9 | 0.0 | 137067.9 | 147052.1 |
| CO | kg/hr | 5784.2 | 0.0 | 5784.2 | 5926.9 |
| O2 | kg/hr | 0.0 | 0.0 | 0.0 | 0.0 |
| PROPY-01 | kg/hr | 0.0 | 0.0 | 0.0 | 0.0 |
| H2S | kg/hr | 0.0 | 0.0 | 0.0 | 0.0 |
| THIOPHEN | kg/hr | 0.0 | 0.0 | 0.0 | 0.0 |
| N-BUTANE | kg/hr | 0.0 | 0.0 | 0.0 | 0.0 |

TABLE 5E

List of Aspen Plus flowsheet stream properties for FIG. 7.

| | Stream | 33 | 34 | 35 | 36 | 37 | 38 | 39 | 40 |
|---|---|---|---|---|---|---|---|---|---|
| Temperature | ° C. | 580 | 580 | 580 | 580 | 580 | 25 | 1811.9 | 500 |
| Pressure | bar | 30 | 30 | 30 | 30 | 30 | 30 | 30 | 30 |
| Mole Fractions | | | | | | | | | |
| CH4 | | 0.00000 | 0.11957 | 0.09618 | 0.00000 | 0.10413 | 0.00000 | 0.00000 | 0.00000 |
| C3H8 | | 0.00000 | 0.00000 | 0.00000 | 0.00000 | 0.00000 | 0.00000 | 0.00000 | 0.00000 |
| C2H6 | | 0.00000 | 0.00001 | 0.00000 | 0.00000 | 0.00000 | 0.00000 | 0.00000 | 0.00000 |
| N-PEN-01 | | 0.00000 | 0.00000 | 0.00000 | 0.00000 | 0.00000 | 0.00000 | 0.00000 | 0.00000 |
| N-HEX-01 | | 0.00000 | 0.00000 | 0.00000 | 0.00000 | 0.00000 | 0.00000 | 0.00000 | 0.00000 |
| H2O | | 0.00000 | 0.53025 | 0.47276 | 0.00000 | 0.51182 | 0.00000 | 0.59379 | 0.59379 |
| H2 | | 1.00000 | 0.00995 | 0.08480 | 1.00000 | 0.00918 | 0.00000 | 0.00975 | 0.00975 |
| N2 | | 0.00000 | 0.00065 | 0.00062 | 0.00000 | 0.00067 | 0.00000 | 0.00056 | 0.00056 |
| CO2 | | 0.00000 | 0.31936 | 0.32591 | 0.00000 | 0.35283 | 0.00000 | 0.36678 | 0.36678 |
| CO | | 0.00000 | 0.02022 | 0.01973 | 0.00000 | 0.02136 | 0.00000 | 0.02908 | 0.02908 |
| O2 | | 0.00000 | 0.00000 | 0.00000 | 0.00000 | 0.00000 | 1.00000 | 0.00004 | 0.00004 |
| PROPY-01 | | 0.00000 | 0.00000 | 0.00000 | 0.00000 | 0.00000 | 0.00000 | 0.00000 | 0.00000 |
| H2S | | 0.00000 | 0.00000 | 0.00000 | 0.00000 | 0.00000 | 0.00000 | 0.00000 | 0.00000 |
| THIOPHEN | | 0.00000 | 0.00000 | 0.00000 | 0.00000 | 0.00000 | 0.00000 | 0.00000 | 0.00000 |
| N-BUTANE | | 0.00000 | 0.00000 | 0.00000 | 0.00000 | 0.00000 | 0.00000 | 0.00000 | 0.00000 |
| Mass Flows | kg/hr | 1888.1 | 273396.7 | 273396.7 | 1672.8 | 271723.9 | 64317.6 | 336041.5 | 336041.5 |
| CH4 | kg/hr | 0.0 | 20069.7 | 16777.6 | 0.0 | 16777.6 | 0.0 | 0.0 | 0.0 |
| C3H8 | kg/hr | 0.0 | 0.0 | 0.0 | 0.0 | 0.0 | 0.0 | 0.0 | 0.0 |
| C2H6 | kg/hr | 0.0 | 1.8 | 1.4 | 0.0 | 1.4 | 0.0 | 0.0 | 0.0 |
| N-PEN-01 | kg/hr | 0.0 | 0.0 | 0.0 | 0.0 | 0.0 | 0.0 | 0.0 | 0.0 |

TABLE 5E-continued

List of Aspen Plus flowsheet stream properties for FIG. 7.

| | Stream | 33 | 34 | 35 | 36 | 37 | 38 | 39 | 40 |
|---|---|---|---|---|---|---|---|---|---|
| N-HEX-01 | kg/hr | 0.0 | 0.0 | 0.0 | 0.0 | 0.0 | 0.0 | 0.0 | 0.0 |
| H2O | kg/hr | 0.0 | 99947.1 | 92605.4 | 0.0 | 92605.4 | 0.0 | 129818.9 | 129818.9 |
| H2 | kg/hr | 1888.1 | 209.8 | 1858.7 | 1672.8 | 185.9 | 0.0 | 238.5 | 238.5 |
| N2 | kg/hr | 0.0 | 189.4 | 189.4 | 0.0 | 189.4 | 0.0 | 189.4 | 189.4 |
| CO2 | kg/hr | 0.0 | 147052.1 | 155955.1 | 0.0 | 155955.1 | 0.0 | 195893.8 | 195893.8 |
| CO | kg/hr | 0.0 | 5926.9 | 6009.1 | 0.0 | 6009.1 | 0.0 | 9885.8 | 9885.8 |
| O2 | kg/hr | 0.0 | 0.0 | 0.0 | 0.0 | 0.0 | 64317.6 | 15.0 | 15.0 |
| PROPY-01 | kg/hr | 0.0 | 0.0 | 0.0 | 0.0 | 0.0 | 0.0 | 0.0 | 0.0 |
| H2S | kg/hr | 0.0 | 0.0 | 0.0 | 0.0 | 0.0 | 0.0 | 0.0 | 0.0 |
| THIOPHEN | kg/hr | 0.0 | 0.0 | 0.0 | 0.0 | 0.0 | 0.0 | 0.0 | 0.0 |
| N-BUTANE | kg/hr | 0.0 | 0.0 | 0.0 | 0.0 | 0.0 | 0.0 | 0.0 | 0.0 |

TABLE 5F

List of Aspen Plus flowsheet stream properties for FIG. 7.

| | Stream | 41 | 42 | 43 |
|---|---|---|---|---|
| Temperature | ° C. | 580 | 373 | 283 |
| Pressure | bar | 30 | 9 | 55.63629 |
| Mole Fractions | | | | |
| CH4 | | 0.00000 | 0.00000 | 0.00000 |
| C3H8 | | 0.00000 | 0.00000 | 0.00000 |
| C2H6 | | 0.00000 | 0.00000 | 0.00000 |
| N-PEN -01 | | 0.00000 | 0.00000 | 0.00000 |
| N-HEX -01 | | 0.00000 | 0.00000 | 0.00000 |
| H2O | | 0.00000 | 0.00000 | 1.00000 |
| H2 | | 1.00000 | 1.00000 | 0.00000 |
| N2 | | 0.00000 | 0.00000 | 0.00000 |
| CO2 | | 0.00000 | 0.00000 | 0.00000 |
| CO | | 0.00000 | 0.00000 | 0.00000 |
| O2 | | 0.00000 | 0.00000 | 0.00000 |
| PROPY-01 | | 0.00000 | 0.00000 | 0.00000 |
| H2S | | 0.00000 | 0.00000 | 0.00000 |
| THIOPHEN | | 0.00000 | 0.00000 | 0.00000 |
| N-BUTANE | | 0.00000 | 0.00000 | 0.00000 |
| Mass Flows | kg/hr | 26934.9 | 1.5 | 224149.7 |
| CH4 | kg/hr | 0.0 | 0.0 | 0.0 |
| C3H8 | kg/hr | 0.0 | 0.0 | 0.0 |
| C2H6 | kg/hr | 0.0 | 0.0 | 0.0 |
| N-PEN-01 | kg/hr | 0.0 | 0.0 | 0.0 |
| N-HEX -01 | kg/hr | 0.0 | 0.0 | 0.0 |
| H2O | kg/hr | 0.0 | 0.0 | 224149.7 |
| H2 | kg/hr | 26934.9 | 1.5 | 0.0 |
| N2 | kg/hr | 0.0 | 0.0 | 0.0 |
| CO2 | kg/hr | 0.0 | 0.0 | 0.0 |
| CO | kg/hr | 0.0 | 0.0 | 0.0 |
| O2 | kg/hr | 0.0 | 0.0 | 0.0 |
| PROPY-01 | kg/hr | 0.0 | 0.0 | 0.0 |
| H2S | kg/hr | 0.0 | 0.0 | 0.0 |
| THIOPHEN | kg/hr | 0.0 | 0.0 | 0.0 |
| N-BUTANE | kg/hr | 0.0 | 0.0 | 0.0 |

The systems developed in the present invention solve several technical problems associated with conventional steam methane reforming. Conventional HERs utilize natural gas to generate the required thermal energy input which results in significant carbon emissions that are environmentally detrimental. The present invention disclosure develops membrane-based integrated gas heated and autothermal reformers. The waste heat entailed in the output stream of the autothermal reformer is utilized to operate the endothermic heat-exchanger reformer. In addition, the system configurations developed also include membrane-based hydrogen separation. Conventionally, pressure swing adsorption (PSA)-based hydrogen separation techniques are utilized to separate hydrogen from the product gas mixtures. However, system configurations 2 and 3 in the present invention include in-situ hydrogen separation via selective hydrogen permeable membranes. The system configuration 2 includes in-situ hydrogen separation during a water gas shift reaction while the system configuration 3 includes in-situ hydrogen separation in a membrane reformer. These configurations provide a pure stream of hydrogen, higher reaction rates, and higher conversions (based on the Le Chatelier's principle) which aid in eliminating the need of utilizing a PSA-based hydrogen separation system. Thus, leading to a more intensified and efficient process.

Embodiments

An embodiment described herein provides a method for producing hydrogen. The method includes desulfurizing a natural gas stream to form a sweet gas stream, converting higher hydrocarbons in the sweet gas stream to methane to form a methane stream, converting a portion of the methane in the methane stream to a syngas stream in a membrane reformer, and separating a portion of hydrogen from the syngas stream as a permeate stream from the membrane reformer. The retentate stream from the membrane reformer is fed to an autothermal reformer to form an oxidized stream. The membrane reformer is heated with the oxidizer stream.

In an aspect, combinable with any other aspect, desulfurizing the natural gas stream includes passing the natural gas stream through a hydrodesulfurization reactor.

In an aspect, combinable with any other aspect, the higher hydrocarbons include ethane, propane, butane, pentane, hexane, or any isomer thereof, or any combination thereof.

In an aspect, combinable with any other aspect, converting the higher hydrocarbons to methane includes passing the sweet gas stream over a nickel catalyst in a pre-reforming reactor.

In an aspect, combinable with any other aspect, converting a portion of the methane in the methane stream to a syngas stream includes performing a steam reforming reaction in the membrane reformer.

In an aspect, combinable with any other aspect, the retentate stream from the membrane reformer is reacted with oxygen to form the oxidized stream.

In an aspect, combinable with any other aspect, the oxidized stream is converted to syngas in the membrane reformer.

In an aspect, combinable with any other aspect, further hydrogen is separated from the syngas in the permeate stream.

Another embodiment described herein provides a system for producing hydrogen from natural gas while recovering heat energy. The system includes a desulfurizer reactor coupled to a natural gas feed, a pre-reformer coupled to an effluent from the desulfurizer, and a membrane reformer coupled to an effluent from the prereformer, wherein a permeate outlet from the membrane reformer removes a hydrogen stream from the membrane reformer. An autothermal reactor (ATR) is coupled to a retentate outlet from the membrane reformer.

In an aspect, combinable with any other aspect, an oxidized stream from the ATR passes through a heat exchanger in the membrane reformer. In an aspect, the oxidized stream passes through the retentate side of the membrane reformer.

In an aspect, combinable with any other aspect, the desulfurizer includes a hydrogen feed.

In an aspect, combinable with any other aspect, the desulfurizer includes a hydrodesulfurization catalyst.

In an aspect, combinable with any other aspect, the pre-reformer includes a nickel catalyst.

In an aspect, combinable with any other aspect, the membrane reformer is a steam reforming reactor configured to use the ATR as a heat source and wherein the membrane reformer includes a hydrogen selective membrane. In an aspect, the membrane reformer includes a hydrogen selective membrane including palladium.

In an aspect, combinable with any other aspect, the ATR includes an oxygen feed.

In an aspect, combinable with any other aspect, the system includes an outlet stream of substantially pure hydrogen.

In an aspect, combinable with any other aspect, the system includes an outlet stream of carbon dioxide including carbon monoxide, steam, and hydrogen.

Other implementations are also within the scope of the following claims.

What is claimed is:

1. A method for producing hydrogen, comprising:

desulfurizing a natural gas stream to form a sweet gas stream;

converting higher hydrocarbons in the sweet gas stream to methane to form a methane stream;

converting a portion of the methane in the methane stream to a syngas stream in a membrane reformer;

separating a portion of hydrogen from the syngas stream as a permeate stream from the membrane reformer;

feeding a retentate stream from the membrane reformer to an autothermal reformer to form an oxidized stream; and heating the membrane reformer with the oxidized stream.

2. The method of claim 1, wherein desulfurizing the natural gas stream comprises passing the natural gas stream through a hydrodesulfurization reactor.

3. The method of claim 1, wherein the higher hydrocarbons comprise ethane, propane, butane, pentane, hexane, or any isomer thereof, or any combination thereof.

4. The method of claim 1, wherein converting the higher hydrocarbons to methane comprises passing the sweet gas stream over a nickel catalyst in a pre-reforming reactor.

5. The method of claim 1, wherein converting a portion of the methane in the methane stream to a syngas stream comprises performing a steam reforming reaction in the membrane reformer.

6. The method of claim 1, wherein the retentate stream from the membrane reformer is reacted with oxygen to form the oxidized stream.

7. The method of claim 1, wherein the oxidized stream is converted to syngas in the membrane reformer.

8. The method of claim 7, wherein further hydrogen is separated from the syngas in the permeate stream.

* * * * *